United States Patent
Wang et al.

(10) Patent No.: US 11,438,609 B2
(45) Date of Patent: Sep. 6, 2022

(54) INTER-LAYER PICTURE SIGNALING AND RELATED PROCESSES

(71) Applicant: QUALCOMM Incorporated, San Diego, CA (US)

(72) Inventors: Ye-Kui Wang, San Diego, CA (US); Jianle Chen, San Diego, CA (US); Krishnakanth Rapaka, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 650 days.

(21) Appl. No.: 14/242,526

(22) Filed: Apr. 1, 2014

(65) Prior Publication Data

US 2014/0301456 A1 Oct. 9, 2014

Related U.S. Application Data

(60) Provisional application No. 61/809,813, filed on Apr. 8, 2013.

(51) Int. Cl.
*H04N 19/30* (2014.01)
*H04N 19/463* (2014.01)
(Continued)

(52) U.S. Cl.
CPC .......... *H04N 19/30* (2014.11); *H04N 19/463* (2014.11); *H04N 19/573* (2014.11); *H04N 19/58* (2014.11); *H04N 19/70* (2014.11)

(58) Field of Classification Search
CPC ...... H04N 19/30; H04N 19/70; H04N 19/187; H04N 19/33; H04N 19/597; H04N 19/46;
(Continued)

(56) References Cited

U.S. PATENT DOCUMENTS 8,467,459 B2 * 6/2013 Yin ........................ H04N 19/70
375/240.12
8,693,549 B2 * 4/2014 Choi .............. H04N 21/234327
375/240.02
(Continued)

FOREIGN PATENT DOCUMENTS

CN 102461171 A 5/2012
JP 2008516556 A 5/2008
(Continued)

OTHER PUBLICATIONS

Sjöberg R., et al., "Overview of HEVC High-Level Syntax and Reference Picture Management," IEEE Transactions on Circuits and Systems for Video Technology, vol. 22 (12), Dec. 2012, pp. 1858-1870.
(Continued)

*Primary Examiner* — Chikaodili E Anyikire
(74) *Attorney, Agent, or Firm* — Shumaker & Sieffert, P.A.

(57) ABSTRACT

In one implementation, an apparatus is provided for encoding or decoding video information. The apparatus comprises a memory configured to store inter-layer reference pictures associated with a current picture that is being coded. The apparatus further comprises a processor operationally coupled to the memory. In one embodiment, the processor is configured to indicate a number of inter-layer reference pictures to use to predict the current picture using inter-layer prediction. The processor is also configured to indicate which of the inter-layer reference pictures to use to predict the current picture using inter-layer prediction. The processor is also configured to determine an inter-layer reference picture set associated with the current picture using the indication of the number of inter-layer reference pictures and the indication of which of the inter-layer reference
(Continued)

pictures to use to predict the current picture using inter-layer prediction.

30 Claims, 8 Drawing Sheets

(51) Int. Cl.
*H04N 19/573* (2014.01)
*H04N 19/70* (2014.01)
*H04N 19/58* (2014.01)

(58) Field of Classification Search
CPC .... H04N 19/172; H04N 19/52; H04N 19/105; H04N 19/44; H04N 19/58; H04N 19/573; H04N 19/159; H04N 19/176; H04N 19/31; H04N 19/59; H04N 19/503; H04N 19/61; H04N 19/184; H04N 19/593
See application file for complete search history.

(56) References Cited

U.S. PATENT DOCUMENTS

| | | | | |
|---|---|---|---|---|
| 9,210,430 | B2* | 12/2015 | Deshpande | H04N 19/105 |
| 9,819,949 | B2* | 11/2017 | Lu | H04N 19/30 |
| 9,900,593 | B2* | 2/2018 | Xiu | H04N 19/52 |
| 9,955,178 | B2* | 4/2018 | Hendry | H04N 19/436 |
| 2005/0117641 | A1 | 6/2005 | Xu et al. | |
| 2007/0086521 | A1* | 4/2007 | Wang | H04N 21/23406 375/240.1 |
| 2007/0160137 | A1 | 7/2007 | Guo et al. | |
| 2007/0286283 | A1* | 12/2007 | Yin | H04N 19/70 375/240.16 |
| 2008/0101470 | A1* | 5/2008 | Hong | H04N 21/242 375/240.14 |
| 2008/0232470 | A1 | 9/2008 | Park et al. | |
| 2008/0260034 | A1* | 10/2008 | Wang | H04N 19/52 375/240.16 |
| 2009/0252220 | A1* | 10/2009 | Choi | H04N 21/234327 375/240.02 |
| 2010/0002069 | A1 | 1/2010 | Eleftheriadis et al. | |
| 2010/0034273 | A1 | 2/2010 | Xia et al. | |
| 2010/0061447 | A1 | 3/2010 | Tu et al. | |
| 2010/0061452 | A1 | 3/2010 | Pandit et al. | |
| 2010/0067581 | A1* | 3/2010 | Hong | H04N 19/105 375/240.16 |
| 2010/0232508 | A1 | 9/2010 | Kang et al. | |
| 2011/0243231 | A1 | 10/2011 | Li et al. | |
| 2012/0044322 | A1* | 2/2012 | Tian | H04N 19/597 348/43 |
| 2012/0050475 | A1 | 3/2012 | Tian et al. | |
| 2012/0072499 | A1* | 3/2012 | Cipolli | H04L 65/1089 709/204 |
| 2012/0170646 | A1 | 7/2012 | Baylon et al. | |
| 2012/0189116 | A1* | 7/2012 | Catrein | H04N 21/4623 380/28 |
| 2013/0114742 | A1 | 5/2013 | Hannuksela et al. | |
| 2013/0156101 | A1* | 6/2013 | Lu | H04N 19/30 375/240.12 |
| 2013/0194386 | A1 | 8/2013 | Leontaris et al. | |
| 2013/0195169 | A1 | 8/2013 | Jang et al. | |
| 2013/0208792 | A1* | 8/2013 | He | H04N 19/105 375/240.12 |
| 2013/0215975 | A1* | 8/2013 | Samuelsson | H04N 19/58 375/240.25 |
| 2013/0223524 | A1* | 8/2013 | Lu | H04N 19/187 375/240.12 |
| 2013/0230108 | A1* | 9/2013 | Leannec | H04N 19/70 375/240.16 |
| 2013/0272403 | A1 | 10/2013 | Ramasubramonian et al. | |
| 2014/0010291 | A1* | 1/2014 | He | H04N 19/50 375/240.12 |
| 2014/0010294 | A1* | 1/2014 | Ye | H04N 19/00424 375/240.12 |
| 2014/0050264 | A1 | 2/2014 | He et al. | |
| 2014/0064374 | A1* | 3/2014 | Xiu | H04N 19/52 375/240.16 |
| 2014/0072031 | A1* | 3/2014 | Xiu | H04N 19/105 375/240.02 |
| 2014/0092964 | A1* | 4/2014 | Ugur | H04N 19/52 375/240.12 |
| 2014/0133567 | A1* | 5/2014 | Rusanovskyy | H04N 19/513 375/240.16 |
| 2014/0181885 | A1* | 6/2014 | Rusert | H04N 21/234327 725/131 |
| 2014/0211849 | A1* | 7/2014 | Deshpande | H04N 19/105 375/240.12 |
| 2014/0218473 | A1* | 8/2014 | Hannuksela | H04N 19/176 348/43 |
| 2014/0219346 | A1 | 8/2014 | Ugur et al. | |
| 2014/0254669 | A1 | 9/2014 | Rapaka et al. | |
| 2014/0254681 | A1* | 9/2014 | Aminlou | H04N 19/105 375/240.16 |
| 2014/0286433 | A1 | 9/2014 | He et al. | |
| 2014/0301452 | A1* | 10/2014 | Deshpande | H04N 19/503 375/240.12 |
| 2014/0301453 | A1* | 10/2014 | Deshpande | H04N 19/50 375/240.12 |
| 2014/0301456 | A1* | 10/2014 | Wang | H04N 19/70 375/240.12 |
| 2014/0301459 | A1* | 10/2014 | Boyce | H04N 19/507 375/240.12 |
| 2014/0301463 | A1 | 10/2014 | Rusanovskyy et al. | |
| 2015/0016523 | A1 | 1/2015 | Puri et al. | |
| 2015/0043657 | A1* | 2/2015 | Choi | H04N 19/597 375/240.26 |
| 2015/0078446 | A1 | 3/2015 | Jun et al. | |
| 2015/0139325 | A1* | 5/2015 | Chuang | H04N 19/51 375/240.16 |
| 2015/0215632 | A1* | 7/2015 | Choi | H04N 19/30 375/240.16 |
| 2015/0229967 | A1 | 8/2015 | Lee | |
| 2015/0334399 | A1* | 11/2015 | Hendry | H04N 19/172 375/240.12 |
| 2015/0358635 | A1 | 12/2015 | Xiu et al. | |
| 2016/0037178 | A1 | 2/2016 | Lee et al. | |
| 2016/0044330 | A1* | 2/2016 | Choi | H04N 19/503 375/240.12 |
| 2016/0050424 | A1* | 2/2016 | Choi | H04N 19/70 375/240.12 |
| 2016/0050430 | A1 | 2/2016 | Xiu et al. | |
| 2016/0065980 | A1* | 3/2016 | Choi | H04N 19/70 375/240.25 |
| 2016/0065983 | A1* | 3/2016 | Choi | H04N 19/70 375/240.12 |
| 2016/0073115 | A1* | 3/2016 | Yoon | H04N 19/56 375/240.12 |
| 2017/0041641 | A1* | 2/2017 | Deshpande | H04N 19/44 |
| 2018/0131952 | A1* | 5/2018 | Xiu | H04N 19/52 |
| 2018/0288427 | A1* | 10/2018 | Hendry | H04N 19/70 |

FOREIGN PATENT DOCUMENTS

| | | |
|---|---|---|
| JP | 2009528715 A | 8/2009 |
| JP | 2010516098 A | 5/2010 |
| JP | 2012525768 A | 10/2012 |
| KR | 20120013966 A | 2/2012 |
| WO | WO-2007080223 A1 * | 7/2007 ........... H04N 19/573 |
| WO | 2010126608 A2 | 11/2010 |
| WO | WO-2010126612 A2 | 11/2010 |
| WO | WO-2013006114 A1 | 1/2013 |
| WO | WO-2013156678 A1 | 10/2013 |

OTHER PUBLICATIONS

Choi B., et al., "AHG7: Reference picture marking process for MV-HEVC," 3. JCT-3V Meeting; 103. MPEG Meeting; Jan. 17, 2013-Jan. 23, 2013; Geneva; (The Joint Collaborative Team on 3D Video Coding Extension Development of ISO/IECJTC1/SC29/

(56) References Cited

OTHER PUBLICATIONS

WG11 and ITU-T SG.16); URL: http://phenix.int-evry.fr/jct2/,, No. JCT3V-C0082, Jan. 11, 2013 (Jan. 11, 2013), 5 pages, XP030130498.
International Search Report and Written Opinion—PCT/US2014/032718—ISA/EPO—dated Jul. 4, 2014.
Ramasubramonian A.K., et al., "AHG7: Slice header prediction for MV-HEVC," 3. JCT-3V Meeting; 103. MPEG Meeting; Jan. 17, 2013-Jan. 23, 2013; Geneva; (The Joint Collaborative Team on 3D Video Coding Extension Development of ISO/IECJTC1/SC29/WG11 and ITU-T SG.16); URL: http://phenix.int-evry.fr/jct2/, No. JCT3V-C0061, Jan. 10, 2013 (Jan. 10, 2013), XP030130477, 7 pages.
Wang Y-K., et al., "AHG9: Signalling and derivation of Inter-Layer RPS for HEVC 3DV and Scalable Extensions", Joint Collaborative Team on Video Coding (JCT-VC) of ITU-T SG 16 WP 3 and ISO/IEC JTC 1/SC 29/WG 11, 13th Meeting: Incheon, KR, Apr. 2013, JCTVC-M0269, pp. 1-5.
Wang Y-K., et al., "MV-HEVC/SHVC HLS: Signalling and Derivation of Inter-Layer RPS for HEVC 3DV and Scalable Extensions", 5775 Morehouse Drive San Diego, CA, 92121-1714, USA, Apr. 2013, JCT3V-D0048, pp. 1-5, URL: http://phenix.it-sudparis.eu/jct2/doc_end_user/documents/4_Incheon/wg11/JCT3V-D0048-v1.zip.

\* cited by examiner

INTER-LAYER PICTURE SIGNALING AND RELATED PROCESSES

CROSS REFERENCE TO RELATED APPLICATIONS

This application claims priority to U.S. Provisional No. 61/809,813, filed Apr. 8, 2013, which is incorporated by reference in its entirety.

BACKGROUND

Field

This disclosure is related to the field of video coding and compression. In particular, it is related to scalable video coding (SVC), including SVC for Advanced Video Coding (AVC), as well as SVC for High Efficiency Video Coding (HEVC), which is also referred to as Scalable HEVC (SHVC). It is also related to 3D video coding, such as the multiview extension of HEVC, referred to as MV-HEVC. Various embodiments relate to systems and methods for improved inter-layer prediction signaling and related processes (e.g., derivation of inter-layer reference picture sets, derivation of reference picture lists, etc.).

Description of the Related Art

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Certain video coding techniques utilize video information from one or more layers to predict the value of video information in another layer. Such prediction is generally referred to as inter-layer prediction (ILP). In general, the layers reside in the same access unit. In some cases, the video block being predicted is in a higher than the layer containing the video information used to perform the prediction. For example, in some cases, the video block being predicted (e.g., the current block) resides in an enhancement layer (as discussed below) and the video information used to predict the current block resides in a lower enhancement layer or a base layer.

High efficiency video coding (HEVC) provides techniques for such inter-layer prediction. However, current techniques suffer from various inefficiencies that limit coding performance. For example, using current techniques, if ILP is not used for a picture, or if ILP is used but only one inter-layer reference picture (ILRP) is allowed to be used during ILP, coding devices (e.g., encoders, decoders) will have to use reference picture list modification syntax elements. Such syntax elements cost bits, and can therefore negatively affect processing and coding efficiency.

In addition, using current techniques, in some situations the derivation of a reference picture subset may not properly occur when inter-layer prediction is used. For example, in one access unit, if a picture of a current enhancement layer has no picture for a layer that is a direct dependent layer of the current enhancement layer, the current derivation process of an inter-layer reference picture set (RPS) subset (e.g., RefPicSetInterLayer) does not work well. This is because the current derivation process assumes that all pictures of all directly dependent layers are present. In particular, there is presently no way for decoders to know whether an entry in an inter-layer RPS subset (e.g., RefPicSetInterLayer) corresponding to no picture in the decoded picture buffer (DPB) is lost during transmission or if it was not in the original bitstream.

Techniques described herein address these and other issues relating to such techniques.

SUMMARY OF THE DISCLOSURE

In general, this disclosure describes techniques related to scalable video coding (SVC). Various techniques described below provide describe methods and devices for inter-layer prediction signaling and related processes.

In one implementation, an apparatus is provided for encoding or decoding video information. The apparatus comprises a memory configured to store video information and/or reference layer pictures associated with a base layer, an enhancement layer, or both. The apparatus further comprises a processor operationally coupled to the memory. The processor is configured to restrict usage of at most one reference layer picture as an inter-layer reference picture to determine a value of a video unit in the enhancement layer.

In one embodiment, an apparatus is provided for encoding or decoding video information. The apparatus includes a memory configured to store inter-layer reference pictures associated with a current picture that is being coded. The apparatus also includes a processor operationally coupled to the memory. In one embodiment, the processor is configured to indicate a number of inter-layer reference pictures to use to predict the current picture using inter-layer prediction. The processor is also configured to indicate which of said inter-layer reference pictures to use to predict the current picture using inter-layer prediction. The processor is also configured to determine an inter-layer reference picture set associated with the current picture using the indication of the number of inter-layer reference pictures and the indication of which of said inter-layer reference pictures to use to predict the current picture using inter-layer prediction.

In another embodiment, a method of decoding video information is provided. The method includes: storing inter-layer reference pictures associated with a current picture being coded; indicating a number of inter-layer reference pictures to use to predict the current picture using inter-layer prediction; indicating which of said inter-layer reference pictures to use to predict the current picture using inter-layer prediction; determining an inter-layer reference picture set associated with the current picture using the indication of the number of inter-layer reference pictures and the indication of which of said inter-layer reference pictures to use to predict the current picture using inter-layer prediction; and decoding the current picture using the inter-layer reference picture set and inter-layer prediction.

In another embodiment, a method of encoding video information is provided. The method includes: storing inter-layer reference pictures associated with a current picture being coded; indicating a number of inter-layer reference pictures to use to predict the current picture using inter-layer prediction; indicating which of said inter-layer reference pictures to use to predict the current picture using inter-layer prediction; determining an inter-layer reference picture set associated with the current picture using the indication of the number of inter-layer reference pictures and the indication of which of said inter-layer reference pictures to use to predict the current picture using inter-layer prediction; and encoding the current picture using the inter-layer reference picture set and inter-layer prediction.

In another embodiment, an apparatus configured to code video information is provided. The apparatus includes: means for storing inter-layer reference pictures associated with a current picture being coded; means for indicating a number of inter-layer reference pictures to use to predict the current picture using inter-layer prediction; means for indicating which of said inter-layer reference pictures to use to predict the current picture using inter-layer prediction; means for determining an inter-layer reference picture set associated with the current picture using the indication of the number of inter-layer reference pictures and the indication of which of said inter-layer reference pictures to use to predict the current picture using inter-layer prediction; and means for coding the current picture using the inter-layer reference picture set and inter-layer prediction.

In yet another embodiment, a non-transitory computer readable medium is provided. The non-transitory computer readable medium includes specific instruction that when executed on a processor comprising computing hardware cause the processor to: store inter-layer reference pictures associated with a current picture being coded; indicate a number of inter-layer reference pictures to use to predict the current picture using inter-layer prediction; indicate which of said inter-layer reference pictures to use to predict the current picture using inter-layer prediction; determine an inter-layer reference picture set associated with the current picture using the indication of the number of inter-layer reference pictures and the indication of which of said inter-layer reference pictures to use to predict the current picture using inter-layer prediction; and code the current picture using the inter-layer reference picture set and inter-layer prediction.

The details of one or more examples are set forth in the accompanying drawings and the description below, which are not intended to limit the full scope of the inventive concepts described herein. Other features, objects, and advantages will be apparent from the description and drawings, and from the claims.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF SPECIFIC EMBODIMENTS

Figure 1:
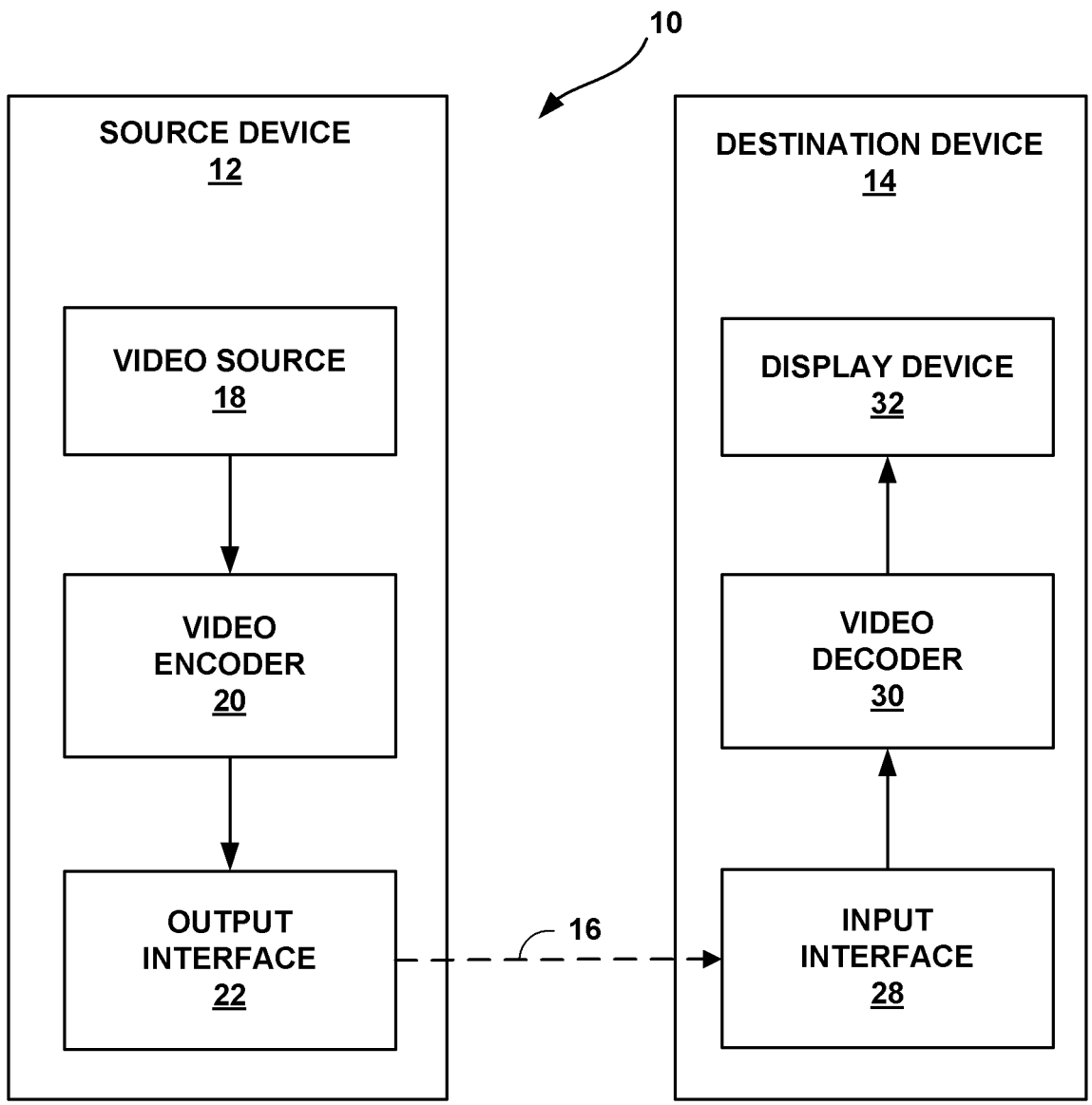
FIG. 1 is a block diagram illustrating an example video encoding and decoding system that may utilize techniques in accordance with aspects described in this disclosure.

The techniques described in this disclosure generally relate to scalable video coding (SHVC, SVC) and multiview/3D video coding (e.g., multiview coding plus depth, MVC+D). For example, the techniques may be related to, and used with or within, a High Efficiency Video Coding (HEVC) scalable video coding (SVC, sometimes referred to as SHVC) extension. In an SHVC, SVC extension, there could be multiple layers of video information. The layer at the very bottom level may serve as a base layer (BL), and the layer at the very top (or the highest layer) may serve as an enhanced layer (EL). The "enhanced layer" is sometimes referred to as an "enhancement layer," and these terms may be used interchangeably. The base layer is sometimes referred to as a "reference layer," (RL) and these terms may also be used interchangeably. All layers in between the base layer and the top layer may serve as either or both ELs or reference layers (RLs). For example, a layer in the middle may be an EL for the layers below it, such as the base layer or any intervening enhancement layers, and at the same time serve as a RL for the enhancement layers above it. Each layer in between the base layer and the top layer (or the highest layer) is may be used as a reference for inter-layer prediction by a higher layer and may use a lower layer as a reference for inter-layer prediction.

For simplicity, examples are presented in terms of just two layers: a BL and an EL; however, it should be well understood that the ideas and embodiments described below are applicable to cases with multiple layers, as well. In addition, for ease of explanation, the terms "frames" or "blocks" are often used. However, these terms are not meant to be limiting. For example, the techniques described below can be used with any of a variety of video units, including but not limited to pixels, blocks (e.g., CU, PU, TU, macroblocks, etc.), slices, frames, picture, etc.

Video Coding

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) and Multi-view Coding plus Depth (MVC+D) extensions. The latest HEVC draft specification, and referred to as HEVC WD10 hereinafter, is available from http://phenix.int-evry.fr/jct/doc _end_user/documents/ 12_Geneva/wg11/JCTVC-L1003-v34.zip. The multiview extension to HEVC, namely MV-HEVC, is also being developed by the JCT-3V. A recent Working Draft (WD) of MV-HEVC WD3 hereinafter, is available from http://phenix.it-sudparis.eu/jct2/doc_end_user/documents/3_Geneva/wg11/JCT3V-C1004-v4.zip. The scalable extension to HEVC, named SHVC, is also being developed by the JCT-VC. A recent Working Draft (WD) of SHVC and referred to as SHVC WD1 hereinafter, is available from http://phenix.int-evry.fr/jct/doc _end_user/documents/ 12_Geneva/wg11/JCTVC-L1008-v1.zip.

In SVC, video information may be provided as multiple layers. The layer at the very bottom level can just serve as a base layer (BL) and the layer at the very top level can serve as an enhancement layer (EL). All the layers between the top and bottom layers may serve as both enhancement layers and base layers. For example, a layer in the middle can be an EL for the layers below it, and at the same time as a BL for the layers above it. For simplicity of description, we can assume that there are two layers, a BL and an EL, in illustrating the techniques described below. However, all the techniques described herein are applicable to cases with multiple (more than two) layers, as well.

Scalable video coding (SVC) may be used to provide quality (also referred) to as signal-to-noise (SNR)) scalability, spatial scalability and/or temporal scalability. For example, in one embodiment, a reference layer (e.g., a base layer) includes video information sufficient to display a video at a first quality level and the enhancement layer includes additional video information relative to the reference layer such that the reference layer and the enhancement layer together include video information sufficient to display the video at a second quality level higher than the first level (e.g., less noise, greater resolution, better frame rate, etc.). An enhanced layer may have different spatial resolution than a base layer. For example, the spatial aspect ratio between EL and BL can be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

In the SVC extension for H.264, prediction of a current block may be performed using the different layers that are provided for SVC. Such prediction may be referred to as inter-layer prediction. Inter-layer prediction methods may be utilized in SVC in order to reduce inter-layer redundancy. Some examples of inter-layer prediction may include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information (including motion vectors) of the base layer to predict motion in the enhancement layer. Inter-layer residual prediction uses the residue of the base layer to predict the residue of the enhancement layer.

In some embodiments of inter-layer motion prediction, the motion data (including motion vectors) of the base layer (e.g., for the co-located block) may be used to predict the current block in the enhancement layer. For example, while coding a video unit in an enhancement layer, video coders can use information from a reference layer to obtain additional motion compensation data that can be used to identify additional hypotheses. As these additional hypotheses are implicitly derived from data already existing data in a video bitstream, additional performance in video coding can be gained with little or no additional cost in bitstream size. In another example, motion information from spatially neighboring video units can be used to locate additional hypothesis. The derived hypothesis can then be averaged or otherwise combined with explicitly encoded hypothesis to generate a better prediction of a value of a video unit. In certain situations, such as when the spatial resolution of the base (or reference) layer is different than the spatial resolution of the current block's layer, the base layer motion information is spatially scaled prior to being used to encode or decode the current block. Likewise, the position of a block in a base (or reference) layer may be determined by inter-layer position mapping, as described below, when the layer has a different spatial resolution than the current block's layer.

Video Terminology

Various term used throughout this disclosure are broad terms having their ordinary meaning. In addition, in some embodiments, certain terms relate to the following video concepts. A picture can refer to video picture as that term is used in current standards (e.g., HEVC). A coded picture can refer to a layer representation in SVC, a view component in MVC and a texture or depth view component in MVC+D. An access unit (AU), similar to the term as used in SVC and MVC, can refer to all the coded pictures associated with the same output time and their associated non-video coding layer (non-VCL) network abstraction layer (NAL) units. An intra random access point (IRAP) access unit can refer to an access unit in which all of the coded pictures are IRAP pictures. A coded video sequence (CVS) can refer to a sequence of access units that include, in decoding order, an IRAP access unit having the flag NoRaslOutputFlag equal to 1, including all subsequent access units up to but not including any subsequent access unit that is an IRAP access unit having a NoRaslOutputFlag equal to 1. In addition, a bitstream may refer to a sequence of bits, in the form of a NAL unit stream or byte stream that forms the representation of one or more CVSs. The first access unit in a bitstream is an IRAP access unit, as described above.

Overview

Embodiments described herein address the problems associated with implementing ILP with a current HEVC extension (e.g., the scalable extension to HEVC known as SHVC), including those discussed above. For example, various embodiments of encoding and decoding devices and methods include one or more of the following: (1) signaling and derivation of an inter-layer RPS subset such that it can be used to detect loss of pictures that are used as an inter-layer picture reference; (2) indicating whether the dependent layer having the highest nuh_layer_id is the unique layer used for inter-layer prediction; (3) signaling of no (i.e., zero) or just one direct dependent layer in a slice (or segment) header; (4) changing reference picture list initialization to enable the option of only including one inter-layer reference in an initial reference picture list; and/or (5) allowing an inter-layer reference picture to be empty and added into an initial reference picture list as long as it is not in the final reference picture list. When empty, the picture is added into the inter-layer RPS as a "no reference picture."

Many of the techniques described herein may be implemented as changes to the code, syntax, and/or semantics currently used in various standards (or their drafts). Such standards (or their drafts) include multi-view high efficiency video coding, working draft 3 (MV-HEVC WD3) and the scalable video coding extension to HEVC, working draft 1 (SHVC WD1), as well as future standards and drafts employing similar techniques. Example embodiments of such code, syntax, and/or semantics are provided throughout the disclosure.

Using current techniques, when coding a current picture, an inter-layer reference picture set associated with the current picture is initially generated. The inter-layer reference picture set is generally generated based upon the direct dependent layers of the layer the current picture belongs to. The direct reference layers of the layer that the current picture belongs to are also referred to as the direct reference layers associated with the current picture. A reference picture list is then generated based upon the reference picture set, for which the inter-layer reference picture set is a subset. If the current picture is not to be coded using inter-layer prediction, or if only one picture is allowed to be used to code the current picture, syntax elements must be provided to modify the reference picture list. For example, such additional syntax might indicate that one or more pictures should not be included in the reference picture list. The reference picture list may be modified using such additional syntax.

Techniques described below allow a reference picture list to be constructed in a manner that avoids this inefficiency. For example, according to embodiments below, a reference picture list may be initially constructed in a way that avoids using reference picture list modification and associated syntax. In addition, the techniques of reference picture set and reference picture list construction described below allow a coding device to determine as early as possible whether a missing inter-layer referenced picture was lost (e.g., during transmission) or was not provided (e.g., in the original bitstream).

Indeed, it is advantageous to learn of such missing pictures as early as possible so a coding device can take appropriate action. For example, a coding device may re-request transmission of the missing picture if it learns that it is missing. A missing picture can refer to a picture that is referenced in the inter-layer reference picture set or reference picture list, but is not present in the coding device's decoded picture buffer (which can be included in a coding device's reference frame memory, as illustrated in FIGS. 2A-3B and discussed in greater detail below).

Figure 4:
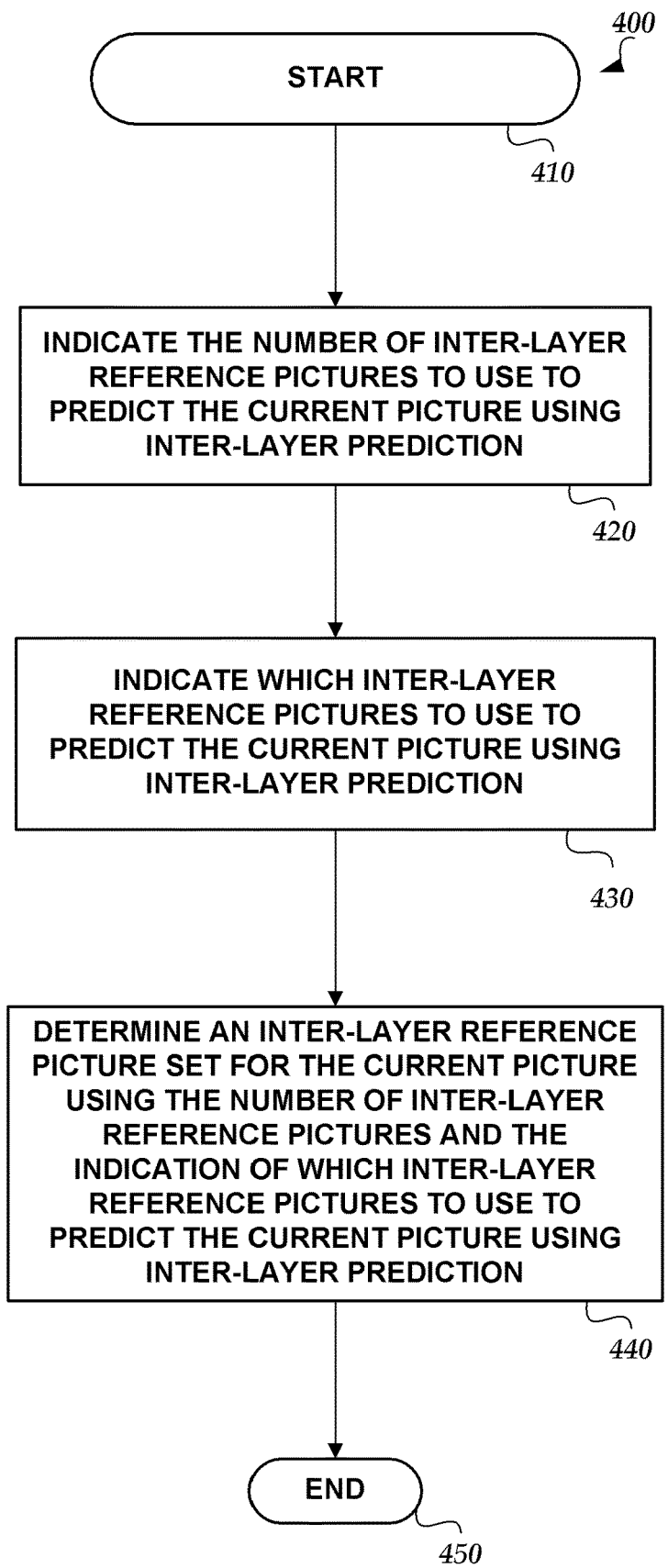
FIGS. 4-6 are flowcharts illustrating embodiments of methods of inter-layer prediction signaling according to aspects of this disclosure.
Figure 5:
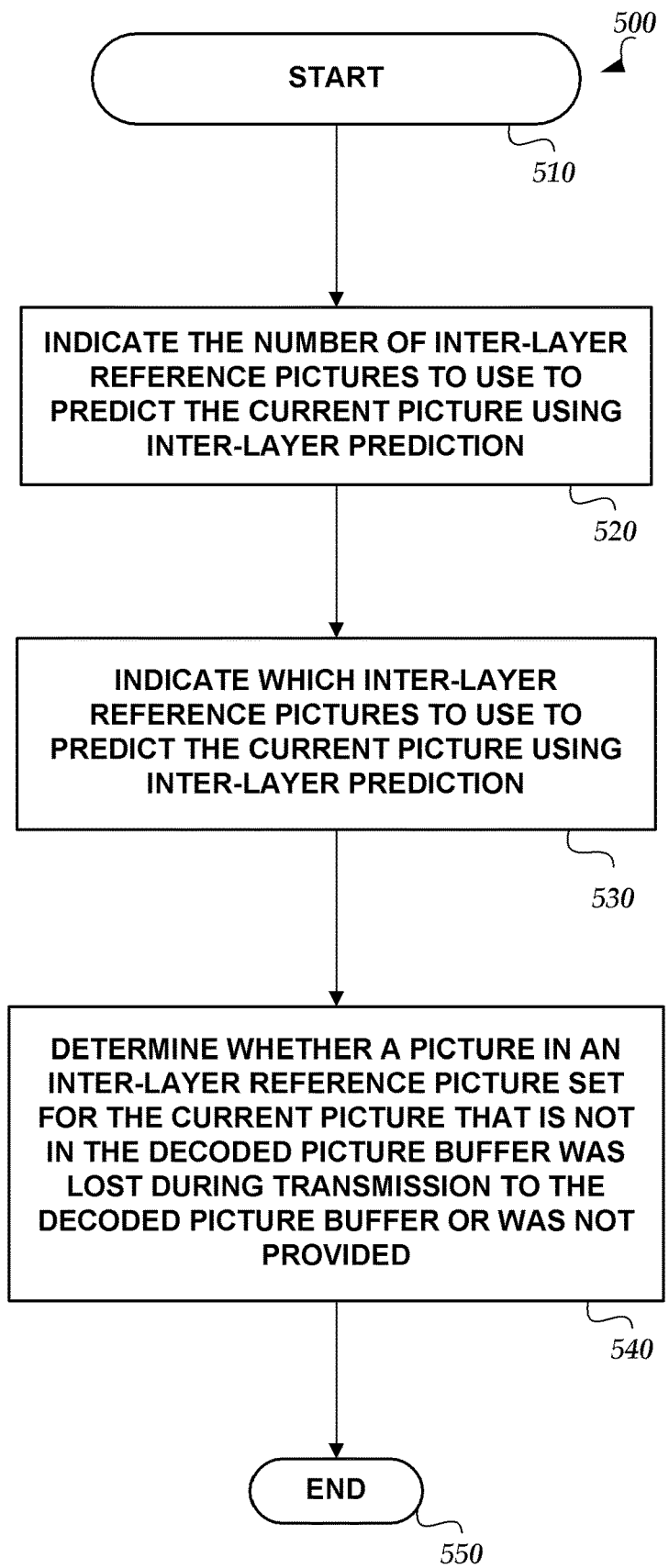

In one embodiment, an inter-layer reference picture set subset is signaled and derived in a manner such that it may be used to detect loss of pictures used for inter-layer picture reference. For example, as illustrated in FIGS. 4 and 5 (as described below), an indication may be signaled where the indication indicates the number of inter-layer reference pictures used to predict the current picture using inter-layer prediction. The number can be between 0 and the number of direct reference layers associated with the current picture. In addition, a restriction may be provided such that all slices of the current picture are required to have the same number of pictures used by the current picture for inter-layer prediction. Furthermore, a device may be configured such that when the number equals zero, this indicates that the current picture is to be coded without using inter-layer prediction. In some embodiments, the number may be restricted to be no more than one (e.g., 0 or 1). Such restriction would effectively allow no more than one reference picture to be used during inter-layer prediction.

In addition, an indication may be signaled where the indication indicates which particular inter-layer reference pictures are used to predict the current picture using inter-layer prediction. A restriction may be provided such that all slices of the current picture are required to use the same inter-layer reference pictures.

In some embodiments, a restriction is further provided such that no (i.e., zero) or just one direct dependent layer is signaled in a slice header of the current picture. Furthermore, in some embodiments, initial reference picture list generation allows the possibility of only including one inter-layer reference picture in an initial reference picture list.

Embodiments of such techniques are further described in greater detail with respect to the example syntax and methods below.

Video Parameter Set Syntax and Semantics for "Highest Dependency Layer Used" Flag In one embodiment a syntax element is provided that includes a flag associated with the highest dependency layer used (e.g., highest_dep_layer_used_flag). The flag specifies whether the highest dependent layer is used for inter-layer prediction for each picture that uses inter-layer prediction. One embodiment of such syntax and semantics are as follows:

TABLE 1

Video Parameter Set Syntax

| vps_extension( ) { | Descriptor |
|---|---|
| ... | |
|     for( i = 1; i <= vps_max_layers_minus1; i++ ) | |
|       for( j = 0; j < i; j++ ) | |
|         direct_dependency_flag[ i ][ j ] | u(1) |
|     highest_dep_layer_used_flag | u(1) |
| } | |

TABLE 2

Video Parameter Set Semantics highest_dep_layer_used_flag equal to 1 specifies that the highest dependent layer is used for inter-layer prediction for each picture that uses inter-layer prediction. highest_dep_layer_used_flag equal to 0 specifies that the highest dependent layer may or may not be used for inter-layer prediction for each picture that uses inter-layer prediction.

General Slice Segment Header Syntax and Semantics

In one embodiment a syntax element is provided that includes a variable (e.g., num_inter_layer_ref_pics) associated with the number of pictures used by the current picture for inter-layer prediction. The syntax element also includes a variable (e.g., ref_layer_idx_delta[i]) that represents the nuh_layer_id of the i-th inter-layer reference picture referred to by the current picture. One embodiment of such syntax and semantics are as follows:

TABLE 3

Slice Segment Header Syntax

| slice_segment_header( ) { | Descriptor |
|---|---|
| ... | |
| if( nuh_layer_id > 0 && NumDirectRefLayers | |
| [ LayerIdInVps[ nuh_layer_id ] > 0 ) | |
| num_inter_layer_ref_pics | ue(v) |
| for( i = 0; i < num_inter_layer_ref_pics; i++ ) | |
| if( i > 0 \|\| !highest_dep_layer_used_flag ) | |
| ref_layer_idx_delta[ i ] | ue(v) |
| } | |
| if( slice_segment_header_extension_present_flag ) { | |
| slice_segment_header_extension_length | ue(v) |
| for( i = 0; i < slice_segment_header_extension_length; i++) | |
| slice_segment_header_extension_data_byte[ i ] | u(8) |
| } | |
| byte_alignment( ) | |
| } | |

TABLE 4

Slice Segment Header Semantics num_inter_layer_ref_pics specifies the number of pictures used by the current picture for inter-layer prediction. When not present, the value of num_inter_layer_ref_pics is inferred to be equal to 0. The value of num_inter_layer_ref_pics shall be in the range of 0 to NumDirectRefLayers[ LayerIdInVps[ nuh_layer_id ] ], inclusive.
ref_layer_idx_delta[ i ] specifies the variable, RefPicLayerId[ i ], representing the nuh_layer_id of the i-th inter-layer reference picture referred to by the current picture. When highest_dep_layer_used_flag is equal to 1 and num_inter_layer_ref_pics is greater than 0, the value of ref_layer_idx_delta[ 0 ] is inferred to be equal to 0.

All slices of a picture shall have the same value of num_inter_layer_ref_pics. In addition, num_inter_layer_ref_pics equal to 0 indicates that no inter-layer prediction is used for the current picture. The value may be restricted to be less than or equal to 1. For example, an SHVC profile may provide such restriction, such that up to one picture is used for inter-layer reference.

In one embodiment, the reference picture layer identification variable, RefPicLayerId[i] is derived as follows:

TABLE 5

Example of RefPicLayerId[i] Derivation

```
for( i = 0; i < num_inter_layer_ref_pics; i++) {
    currLayerIdx = LayerIdInVps[ nuh_layer_id ]
    if( i == 0 )
        if( highest_dep_layer_used_flag )
            refLayerIdx[ 0 ] = NumDirectRefLayers[
                currLayerIdx ] − 1
        else
            refLayerIdx[ 0 ] =
NumDirectRefLayers[ currLayerIdx ] − 1 − ref_layer_idx_delta[ 0 ]
    else
```

TABLE 5-continued

Example of RefPicLayerId[i] Derivation

```
        refLayerIdx[ i ] = refLayerIdx[ i − 1 ] +
            ref_layer_idx_delta[ i ] + 1
    RefPicLayerId[ i ] = RefLayerId[ currLayerIdx ][ refLayerIdx[ i ] ]
}
```

In such embodiment, all slices of a picture shall have the same reference layer index delta value (e.g., ref_layer_idx_delta).

Reference Picture List Modification Semantics

In one embodiment, subclause F.7.4.7.2 of the SHVC or MV-HEVC specification may be modified to as to how the variable NumPocTotalCurr is derived. For example, in one embodiment, equation 7-43, which specifies the derivation of NumPocTotalCurr is replaced with the following:

TABLE 6

Example of NumPocTotalCurr Derivation

```
NumPocTotalCurr = 0
for( i = 0; i < NumNegativePics[ CurrRpsIdx ]; i++)
    if(UsedByCurrPicS0[ CurrRpsIdx ][ i ])
        NumPocTotalCurr++
```

TABLE 6-continued

Example of NumPocTotalCurr Derivation

```
for( i = 0; i < NumPositivePics[ CurrRpsIdx ]; i++)
    if(UsedByCurrPicS1[ CurrRpsIdx ][ i ])
        NumPocTotalCurr++
for( i = 0; i < num_long_term_sps + num_long_term_pics; i++ )
    if( UsedByCurrPicLt[ i ])
        NumPocTotalCurr++
NumPocTotalCurr += num_inter_layer_ref_pics
```

Decoding Process for Inter-Layer Reference Picture Set

In one embodiment, a decoding process for an inter-layer reference picture set is provided. The output of the process is an updated list of inter-layer reference pictures, RefPicSetInterLayer. In one embodiment, the list RefPicSetInterLayer is first emptied and then derived as follows:

TABLE 7

Example of RefPicSetInterLayer Derivation

```
for( i = 0; i < num_inter_layer_ref_pics; i++ ) {
    if( there is a picture picX in the decoded picture buffer (DPB) that
has the same PicOrderCntVal as the current picture and nuh_layer_id
equal to RefPicLayerId[ i ] ) {
        RefPicSetInterLayer[ i ] = picX
        RefPicSetInterLayer[ i ] is marked as "used for long-term
        reference"
    } else
        RefPicSetInterLayer[ i ] = "no reference picture"
}
```

In such embodiment, there shall be no entry equal to "no reference picture" in the updated list, RefPicSetInterLayer.

Marking Process for Ending the Decoding of a Coded Picture with Nuh_Layer_Id Greater than 0

In one embodiment, a process is provided for marking the end of decoding a coded picture with nuh_layer_id greater than 0. Output of this process is a potentially updated marking as "used for short-term reference" for some decoded pictures. One example process for such marking is as follows:

TABLE 8

Example of Marking RefPicSetInterLayer as
"used for short-term reference"

```
for( i = 0; i < num_inter_layer_ref_pics; i++ )
    RefPicSetInterLayer[ i ] is marked as "used for short-term reference"
```

Decoding Process for Reference Picture List Construction

In one embodiment, a decoding process is provided for reference picture list construction. The process may be invoked at the beginning of the decoding process for each P or B slice. Reference pictures may be addressed through reference indices as specified in existing standards. For example, reference pictures may be addressed as specified in subclause 8.5.3.3.2 of the HEVC standard. A reference index is an index into a reference picture list. When decoding a P slice, there is a single reference picture list RefPicList0. When decoding a B slice, there is a second independent reference picture list RefPicList1 in addition to RefPicList0.

It is a requirement of bitstream conformance that each entry in the final RefPicList0 and RefPicList1 derived below shall correspond to a picture that is present in the decoded picture buffer (DPB). At the beginning of the decoding process for each slice, the reference picture list RefPicList0, and for B slices RefPicList1, are derived as follows: the temporary reference picture list 0 variable NumRpsCurrTempList0 is set equal to Max(num_ref_idx_l0_active_minus1+1, NumPocTotalCurr) and the list RefPicListTemp0 is constructed as follows:

TABLE 9

Example of Constructing Temporary Reference Picture List 0

```
rIdx = 0
while( rIdx < NumRpsCurrTempList0 ) {
    for( i = 0; i < NumPocStCurrBefore && rIdx <
NumRpsCurrTempList0; rIdx++, i++)
        RefPicListTemp0[ rIdx ] = RefPicSetStCurrBefore[ i ]
    for( i = 0; i < NumPocStCurrAfter && rIdx <
```

TABLE 9-continued

Example of Constructing Temporary Reference Picture List 0

```
NumRpsCurrTempList0; rIdx++, i++ )
        RefPicListTemp0[ rIdx ] = RefPicSetStCurrAfter[ i ]
    for( i = 0; i < NumPocLtCurr && rIdx < NumRpsCurrTempList0;
rIdx++, i++ )
        RefPicListTemp0[ rIdx ] = RefPicSetLtCurr[ i ]
    for( i = 0; i < num_inter_layer_ref_pics; rIdx++, i++ )
        RefPicListTemp0[ rIdx ] = RefPicSetInterLayer[ i ]
}
```

The reference picture list 0 (RefPicList0) may then be constructed as follows:

TABLE 10

Example of Constructing the Reference Picture List 0

```
for( rIdx = 0; rIdx <= num_ref_idx_l0_active_minus1; rIdx++)
    RefPicList0[rIdx]=ref_pic_list_modification_flag_l0 ?
    RefPicListTemp0[list_entry_l0[rIdx]] :
    RefPicListTemp0[ rIdx ]
```

When the slice is a B slice, the variable NumRpsCurrTempList1 is set equal to Max(num_ref_idx_l1_active_minus1+1, NumPocTotalCurr) and the list RefPicListTemp1 is constructed as follows:

TABLE 11

Example of Constructing Temporary Reference Picture List 1

```
rIdx = 0
while( rIdx < NumRpsCurrTempList1 ) {
    for( i = 0; i < NumPocStCurrAfter && rIdx <
NumRpsCurrTempList1; rIdx++, i++ )
        RefPicListTemp1[ rIdx ] = RefPicSetStCurrAfter[ i ]
    for( i = 0; i < NumPocStCurrBefore && rIdx <
NumRpsCurrTempList1; rIdx++, i++)
        RefPicListTemp1[ rIdx ] = RefPicSetStCurrBefore[ i ]
    for( i = 0; i < NumPocLtCurr && rIdx < NumRpsCurrTempList1;
rIdx++, i++ )
        RefPicListTemp1[ rIdx ] = RefPicSetLtCurr[ i ]
    for( i = 0; i < num_inter_layer_ref_pics; rIdx++, i++ )
        RefPicListTemp1[ rIdx ] = RefPicSetInterLayer[ i ]
}
```

When the slice is a B slice, the reference picture list RefPicList1 is constructed as follows:

TABLE 12

Example of Constructing Reference Picture List 1

```
for( rIdx = 0; rIdx <= num_ref_idx_l1_active_minus1; rIdx++)
    RefPicList1[ rIdx ] = ref_pic_list_modification_flag_l1 ?
    RefPicListTemp1[
list_entry_l1 [ rIdx ] ] : RefPicListTemp1[ rIdx ]
```

Video Parameter Set Extension Syntax and Semantics for "One ILP Reference Picture Only" Flag In another embodiment, a flag is provided that indicates whether only one inter-layer prediction (ILP) reference picture is used for ILP. The syntax and semantics may be provided as follows:

TABLE 13

| Video Parameter Set Syntax | |
| --- | --- |
| vps_extension( ) { | Descriptor |
| ... | |
|   for( i = 1; i <= vps_max_layers_minus1; i++ ) | |
|     for( j = 0; j < i; j++ ) | |
|       direct_dependency_flag[ i ][ j ] | u(1) |
|   one_ilp_ref_pic_only_flag | u(1) |
| } | |

TABLE 14

| Video Parameter Set Semantics |
| --- |
| one_ilp_ref_pic_only_flag equal to 1 specifies that each picture refers to at most one inter-layer reference picture. one_ilp_ref_pic_only_flag equal to 0 specifies that each picture may refer to more than one inter-layer reference picture. |

One advantage provided with this embodiment is that high-level syntax for both SHVC and the 3DV family of HEVC extensions can still be the same. If it is required that each picture refers to at most one inter-layer reference picture, this flag can be required to be equal to 1 in profile definitions. Otherwise, this embodiment may still be useful for saving bits used for reference picture list modification commands for bitstreams where each picture refers to at most one inter-layer reference picture.

In another embodiment, the syntax may be provided as follows:

TABLE 15

| Video Parameter Set Syntax | |
| --- | --- |
| vps_extension( ) { | Descriptor |
| ... | |
|   for( i = 1; i <= vps_max_layers_minus1; i++ ) | |
|     for( j = 0; j < i; j++ ) | |
|       direct_dependency_flag[ i ][ j ] | u(1) |
|   one_ilp_ref_pic_only_flag | u(1) |
|   if( one_ilp_ref_pic_only_flag ) | |
|     ilp_ref_pic_present_in_slice_flag | u(1) |
| } | |

Semantics in such embodiment may include:

TABLE 16

| Video Parameter Set Semantics |
| --- |
| one_ilp_ref_pic_only_flag equal to 1 specifies that each picture refers to at most one inter-layer reference picture. one_ilp_ref_pic_only_flag equal to 0 specifies that each picture may refer to more than one inter-layer reference picture. |

In this embodiment, high-level syntax for both SHVC and the 3DV family of HEVC extensions can still be the same. If it is required that each picture refers to at most one inter-layer reference picture, this one_ilp_ref_pic_only_flag flag can be required to be equal to 1 in profile definitions. Otherwise, this embodiment may still be useful for saving bits used for reference picture list modification commands for bitstreams where each picture refers to at most one inter-layer reference picture. Semantics may also include:

TABLE 17

| Video Parameter Set Semantics |
| --- |
| ilp_ref_pic_present_in_slice_flag equal to 1 specifies that ref_layer_idx_delta may be present in the slice header. ilp_ref_pic_present_in_slice_flag equal to 0 specifies that ref_layer_idx_delta is not present in the slie header. When not present, the value of ilp_ref_pic_present_in_slice_flag is inferred to be equal to 1. |

In another embodiment, the syntax and semantics may be provided as follows:

TABLE 18

| Video Parameter Set Syntax | |
| --- | --- |
| vps_extension( ) { | Descriptor |
| ... | |
|   for( i = 1; i <= vps_max_layers_minus1; i++ ) | |
|     for( j = 0; j < i; j++ ) | |
|       direct_dependency_flag[ i ][ j ] | u(1) |
|   if( scalability_mask[ 1 ] ) | |
|     ilp_ref_pic_present_in_slice_flag | u(1) |
| } | |

TABLE 19

| Video Parameter Set Semantics |
| --- |
| ilp_ref_pic_present_in_slice_flag equal to 1 specifies that ref_layer_idx_delta may be present in the slice header. ilp_ref_pic_present_in_slice_flag equal to 0 specifies that ref_layer_idx_delta is not present in the slie header. When not present, the value of ilp_ref_pic_present_in_slice_flag is inferred to be equal to 1. |

In this embodiment, when scalability mask[1] is equal to 1, the value of one_ilp_ref_pic_only_flag is inferred to be equal to 1.

General Slice Segment Header Syntax and Semantics

In another embodiment, slice segment header syntax and semantics are provided as follows:

TABLE 20

| Slice Segment Header Syntax | |
| --- | --- |
| slice_segment_header( ) { | Descriptor |
| ... | |
|   if( nuh_layer_id > 0 ) { | |
|     no_inter_layer_pred_flag | u(1) |
|     if( one_ilp_ref_pic_only_flag && !no_inter_layer_pred_flag ) | |
|       ref_layer_idx_delta | ue(v) |
|   } | |
| } | |
| if( slice_segment_header_extension_present_flag ) { | |
|   slice_segment_header_extension_length | ue(v) |
|   for( i = 0; i < slice_segment_header_extension_length; i++) | |
|     slice_segment_header_extension_data_byte[ i ] | u(8) |
| } | |
| byte_alignment( ) | |
| } | |

In yet another embodiment, slice segment header syntax is provided as follows:

TABLE 21

Slice Segment Header Syntax

| slice_segment_header( ) { | Descriptor |
|---|---|
| ... | |
|   if( nuh_layer_id > 0 ) { | |
|     no_inter_layer_pred_flag | u(1) |
|     if( ilp_ref_pic_present_in_slice_flag && | |
|     !no_inter_layer_pred_flag ) | |
|       ref_layer_idx_delta | ue(v) |
|   } | |
| } | |
| if( slice_segment_header_extension_present_flag ) { | |
|   slice_segment_header_extension_length | ue(v) |
|   for( i = 0; i < slice_segment_header_extension_length; i++) | |
|     slice_segment_header_extension_data_byte[ i ] | u(8) |
| } | |
| byte_alignment( ) | |
| } | |

Slice segment header semantics may include:

TABLE 22

Slice Segment Header Semantics no_inter_layer_pred_flag equal to 1 specifies that the curent picture does not use inter-layer prediction.
no_inter_layer_pred_flag equal to 0 specifies that the curent picture may use inter-layer prediction.

In such embodiment, all slices of a picture shall have the same value of no_inter_layer_pred_flag. The variable NumEntInRefPicSetInterLayer may be derived as follows:

TABLE 23

NumEntInRefPicSetInterLayer Derivation if( no_inter_layer_pred_flag | | NumDirectRefLayers[ LayerIdInVps[ nuh_layer_id ] ] = = 0 )
  NumEntInRefPicSetInterLayer = 0
else if( one_ilp_ref_pic_only_flag )
  NumEntInRefPicSetInterLayer = 1
else
  NumEntInRefPicSetInterLayer = NumDirectRefLayers[ LayerIdInVps[ nuh_layer_id ] ]

ref_layer_idx_delta specifies the variable, RefPicLayerId, representing the nuh_layer_id of the inter-layer reference picture referred to by the current picture. When ref_layer_idx_delta is not present, it is inferred to be equal to 0. The variable RefPicLayerId may be derived as follows:

TABLE 24

RefPicLayerId Derivation currLayerIdx = LayerIdInVps[ nuh_layer_id ]
refLayerIdx = NumDirectRefLayers[ currLayerIdx ] − 1 − ref_layer_idx_delta
RefPicLayerId = RefLayerId[ currLayerIdx ][ refLayerIdx ]

In such embodiment, all slices of a picture shall have the same value of ref_layer_idx_delta.

Reference Picture List Modification Semantics

In another embodiment, subclause F.7.4.7.2 of the SHVC or MV-HEVC specification may be modified, as shown below. Equation (7-43) specifying the derivation of Num-PocTotalCurr is replaced by:

TABLE 25

NumPocTotalCurr Derivation

NumPocTotalCurr = 0
for( i = 0; i < NumNegativePics[ CurrRpsIdx ]; i++)
  if(UsedByCurrPicS0[ CurrRpsIdx ][ i ])
    NumPocTotalCurr++
for( i = 0; i < NumPositivePics[ CurrRpsIdx ]; i++)
  if(UsedByCurrPicS1[ CurrRpsIdx ][ i ])
    NumPocTotalCurr++
for( i = 0; i < num_long_term_sps + num_long_term_pics; i++ )
  if( UsedByCurrPicLt[ i ])
    NumPocTotalCurr++
NumPocTotalCurr += NumEntInRefPicSetInterLayer Decoding Process for Inter-Layer Reference Picture Set Output of this process is an updated list of inter-layer reference pictures RefPicSetInterLayer. In one embodiment, the list RefPicSetInterLayer is first emptied and then derived as follows:

TABLE 26

RefPicSetInterLayer Derivation for( i = 0; i < NumEntInRefPicSetInterLayer; i++ ) {
  if( one_ilp_ref_pic_only_flag )
    tmpLayerId = RefPicLayerId
  else
    tmpLayerId = RefLayerId[ LayerIdInVps[ nuh_layer_id ][ i ] ]
  if( there is a picture picX in the DPB that has the same PicOrderCntVal as the current picture and nuh_layer_id is equal to tmpLayerId ) {
    RefPicSetInterLayer[ i ] = picX
    RefPicSetInterLayer[ i ] is marked as "used for long-term reference"
  } else
    RefPicSetInterLayer[ i ] = "no reference picture"
}

In such embodiment, when one_ilp_ref_pic_only_flag is equal to 1, there shall be no entry equal to "no reference picture" in RefPicSetInterLayer.

Marking Process for Ending the Decoding of a Coded Picture with Nuh_Layer_Id Greater than 0

In another embodiment, a marking process is provided for ending the decoding of a coded picture with nuh_layer_id greater than 0. The output of this process is that the marking status of some decoded pictures in the DPB may be changed to be marked as "used for short-term reference":

TABLE 27

Marking Process for( i = 0; i < NumEntInRefPicSetInterLayer; i++ )
  if( the picture RefPicSetInterLayer[ i ] is in the DPB ) )
    RefPicSetInterLayer[ i ] is marked as "used for short-term reference"

Decoding Process for Reference Picture Lists Construction

In another embodiment, a decoding process for reference picture list construction is provided. The process may be used at the beginning of the decoding process for each P or B slice. Reference pictures are addressed through reference indices as specified in subclause 8.5.3.3.2 of the HEVC specification. A reference index is an index into a reference picture list. When decoding a P slice, there is a single reference picture list RefPicList0. When decoding a B slice, there is a second independent reference picture list RefPicList1 in addition to RefPicList0.

It is a requirement of bitstream conformance that each entry in the final RefPicList0 and RefPicList1 derived below shall correspond to a picture that is present in the DPB. In one embodiment, at the beginning of the decoding process for each slice, the reference picture list RefPicList0, and for B slices RefPicList1, are derived as follows. The variable NumRpsCurrTempList0 is set equal to Max(num_ref_idx_l0_active_minus1+1, NumPocTotalCurr) and the temporary reference picture list RefPicListTemp0 is constructed as follows:

TABLE 28

Temporary Reference Picture List 0 (RefPicListTemp0) Construction Process

```
rIdx = 0
while( rIdx < NumRpsCurrTempList0 ) {
    for( i = 0; i < NumPocStCurrBefore && rIdx <
NumRpsCurrTempList0; rIdx++, i++ )
        RefPicListTemp0[ rIdx ] = RefPicSetStCurrBefore[ i ]
    for( i = 0; i < NumPocStCurrAfter && rIdx <
NumRpsCurrTempList0; rIdx++, i++ )
        RefPicListTemp0[ rIdx ] = RefPicSetStCurrAfter[ i ]
    for( i = 0; i < NumPocLtCurr && rIdx < NumRpsCurrTempList0;
rIdx++, i++ )
        RefPicListTemp0[ rIdx ] = RefPicSetLtCurr[ i ]
    for( i = 0; i < NumEntInRefPicSetInterLayer; rIdx++, i++ )
        RefPicListTemp0[ rIdx ] = RefPicSetInterLayer[ i ]
}
```

The final reference picture list RefPicList0 may be constructed as follows:

TABLE 29

Reference Picture List 0 (RefPicList0) Construction Process

```
for( rIdx = 0; rIdx <= num_ref_idx_l0_active_minus1; rIdx++)
    RefPicList0[ rIdx ] = ref_pic_list_modification_flag_l0 ?
RefPicListTemp0[ list_entry_l0[ rIdx] ] : RefPicListTemp0[ rIdx ]
```

When the slice is a B slice, the variable NumRpsCurrTempList1 is set equal to Max(num_ref_idx_l1_active_minus1+1, NumPocTotalCurr) and the list RefPicListTemp1 is constructed as follows:

TABLE 30

Temporary Reference Picture List 1 (RefPicListTemp1) Construction Process

```
rIdx = 0
while( rIdx < NumRpsCurrTempList1 ) {
    for( i = 0; i < NumPocStCurrAfter && rIdx <
NumRpsCurrTempList1; rIdx++, i++ )
        RefPicListTemp1[ rIdx ] = RefPicSetStCurrAfter[ i ]
    for( i = 0; i < NumPocStCurrBefore && rIdx <
NumRpsCurrTempList1; rIdx++, i++ )
        RefPicListTemp1[ rIdx ] = RefPicSetStCurrBefore[ i ]
    for( i = 0; i < NumPocLtCurr && rIdx < NumRpsCurrTempList1;
rIdx++, i++ )
        RefPicListTemp1[ rIdx ] = RefPicSetLtCurr[ i ]
    for( i = 0; i < NumEntInRefPicSetInterLayer; rIdx++, i++ )
        RefPicListTemp1[ rIdx ] = RefPicSetInterLayer[ i ]
}
```

When the slice is a B slice, the final reference picture list 1 RefPicList1 is constructed as follows:

TABLE 31

Reference Picture List 1 (RefPicListTemp1) Construction Process

```
for( rIdx = 0; rIdx <= num_ref_idx_l1_active_minus1; rIdx++)
    RefPicList1[ rIdx ] = ref_pic_list_modification_flag_l1 ?
RefPicListTemp1[ list_entry_l1[ rIdx ] ] : RefPicListTemp1[ rIdx ]
```

In yet another embodiment, a decoding process for an inter-layer picture set is provided. The output of the process is an updated list of inter-layer reference pictures, RefPicSetInterLayer. The list RefPicSetInterLayer is first emptied and then derived as follows:

TABLE 32

Process to Generated Updated List of Inter-Layer Reference Pictures

```
for( i = 0; i < NumDirectRefLayers[ LayerIdInVps[ nuh_layer_id ] ];
i++ ) {
    if( there is a picture picX in the DPB that has the same
PicOrderCntVal as the current picture and nuh_layer_id equal to
RefLayerId[ LayerIdInVps[ nuh_layer_id ][ i ] ] ) {
        RefPicSetInterLayer[ i ] = picX
        RefPicSetInterLayer[ i ] is marked as "used for long-term
reference"
    } else
        RefPicSetInterLayer[ i ] = "no reference picture"
}
```

Marking Process for Ending the Decoding of a Coded Picture with Nuh Layer Id Greater than 0

In another embodiment, a marking process is provided for ending the decoding of a coded picture with nuh_layer_id greater than 0. The output of the process is a potentially updated marking as "used for short-term reference" for some decoded pictures.

TABLE 33

Marking Process

```
for( i = 0; i < NumDirectRefLayers[ LayerIdInVps[ nuh_layer_id ] ];
i++ )
    if( the picture RefPicSetInterLayer[ i ] is in the DPB )
        RefPicSetInterLayer[ i ] is marked as "used for short-term
reference"
```

Decoding Process for Reference Picture Lists Construction

In another embodiment, a decoding process for reference picture list construction is provided. The process may be used at the beginning of the decoding process for each P or B slice. Reference pictures are addressed through reference indices as specified in subclause 8.5.3.3.2 of the HEVC specification. A reference index is an index into a reference picture list. When decoding a P slice, there is a single reference picture list RefPicList0. When decoding a B slice, there is a second independent reference picture list RefPicList1 in addition to RefPicList0.

It is a requirement of bitstream conformance that each entry in the final RefPicList0 and RefPicList1 derived herein shall correspond to a picture that is present in the DPB, and when the decoded video sequence conforming to one or more profiles specified for SHVC, there shall be no more than one inter-layer reference picture included in the union of all pictures in RefPicList0 and all pictures in RefPicList1. In one embodiment, at the beginning of the decoding process for each slice, the reference picture list RefPicList0, and for B slices RefPicList1, are derived as discussed herein.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Video Coding System

FIG. 1 is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 can provide the video data to the destination device 14 via a communication channel 16, which may include a computer-readable storage medium or other communication channel. Source device 12 and destination device 14 may include a wide range of devices, including desktop computers, notebook (e.g., laptop) computers, tablet computers, set-top boxes, telephone handsets, such as so-called "smart" phones, so-called "smart" pads, televisions, cameras, display devices, digital media players, video gaming consoles, in-car computers, video streaming devices, or the like. Source device 12 and destination device 14 may be equipped for wireless communication.

Destination device 14 may receive the encoded video data to be decoded via communication channel 16. Communication channel 16 may comprise a type of medium or device capable of moving the encoded video data from source device 12 to destination device 14. For example, communication channel 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network, such as the Internet. The communication medium may include routers, switches, base stations, or other equipment that may be useful to facilitate communication from source device 12 to destination device 14.

In some embodiments, encoded data may be output from output interface 22 to a storage device. In such examples, channel 16 may correspond to a storage device or computer-readable storage medium that stores the encoded video data generated by source device 12. For example, destination device 14 may access the computer-readable storage medium via disk access or card access. Similarly, encoded data may be accessed from the computer-readable storage medium by input interface 28. The computer-readable storage medium may include any of a variety of distributed or locally accessed data storage media such as a hard drive, Blu-ray discs, DVDs, CD-ROMs, flash memory, volatile or non-volatile memory, or other digital storage media for storing video data. The computer-readable storage medium may correspond to a file server or another intermediate storage device that may store the encoded video generated by source device 12. Destination device 14 may access stored video data from the computer-readable storage medium via streaming or download. The file server may be a type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through a standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the computer-readable storage medium may be a streaming transmission, a download transmission, or a combination of both.

The techniques of this disclosure can apply applications or settings in addition to wireless applications or settings. The techniques may be applied to video coding in support of a of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some embodiments, system 10 may be configured to support one-way or two-way video transmission to support applications such as video streaming, video playback, video broadcasting, and/or video telephony.

In FIG. 1, source device 12 includes video source 18, video encoder 20, and output interface 22. Destination device 14 includes input interface 28, video decoder 30, and display device 32. Video encoder 20 of source device 12 may be configured to apply the techniques for coding a bitstream including video data conforming to multiple standards or standard extensions. In other embodiments, a source device and a destination device may include other components or arrangements. For example, source device 12 may receive video data from an external video source 18, such as an external camera. Likewise, destination device 14 may interface with an external display device, rather than including an integrated display device.

Video source 18 of source device 12 may include a video capture device, such as a video camera, a video archive containing previously captured video, and/or a video feed interface to receive video from a video content provider. Video source 18 may generate computer graphics-based data as the source video, or a combination of live video, archived video, and computer-generated video. In some embodiments, if video source 18 is a video camera, source device 12 and destination device 14 may form so-called camera phones or video phones. The captured, pre-captured, or computer-generated video may be encoded by video encoder 20. The encoded video information may be output by output interface 22 to a communication channel 16, which may include a computer-readable storage medium, as discussed above.

Computer-readable storage medium may include transient media, such as a wireless broadcast or wired network transmission, or storage media (e.g., non-transitory storage media), such as a hard disk, flash drive, compact disc, digital video disc, Blu-ray disc, or other computer-readable media. A network server (not shown) may receive encoded video data from source device 12 and provide the encoded video data to destination device 14 (e.g., via network transmission). A computing device of a medium production facility, such as a disc stamping facility, may receive encoded video data from source device 12 and produce a disc containing the encoded video data. Therefore, communication channel 16 may be understood to include one or more computer-readable storage media of various forms.

Input interface 28 of destination device 14 can receive information from communication channel 16. The information of communication channel 16 may include syntax information defined by video encoder 20, which can be used by video decoder 30, that includes syntax elements that describe characteristics and/or processing of blocks and other coded units, e.g., GOPs. Display device 32 displays the decoded video data to a user, and may include any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete sine transform (DST), a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video Encoder

Figure 2A:
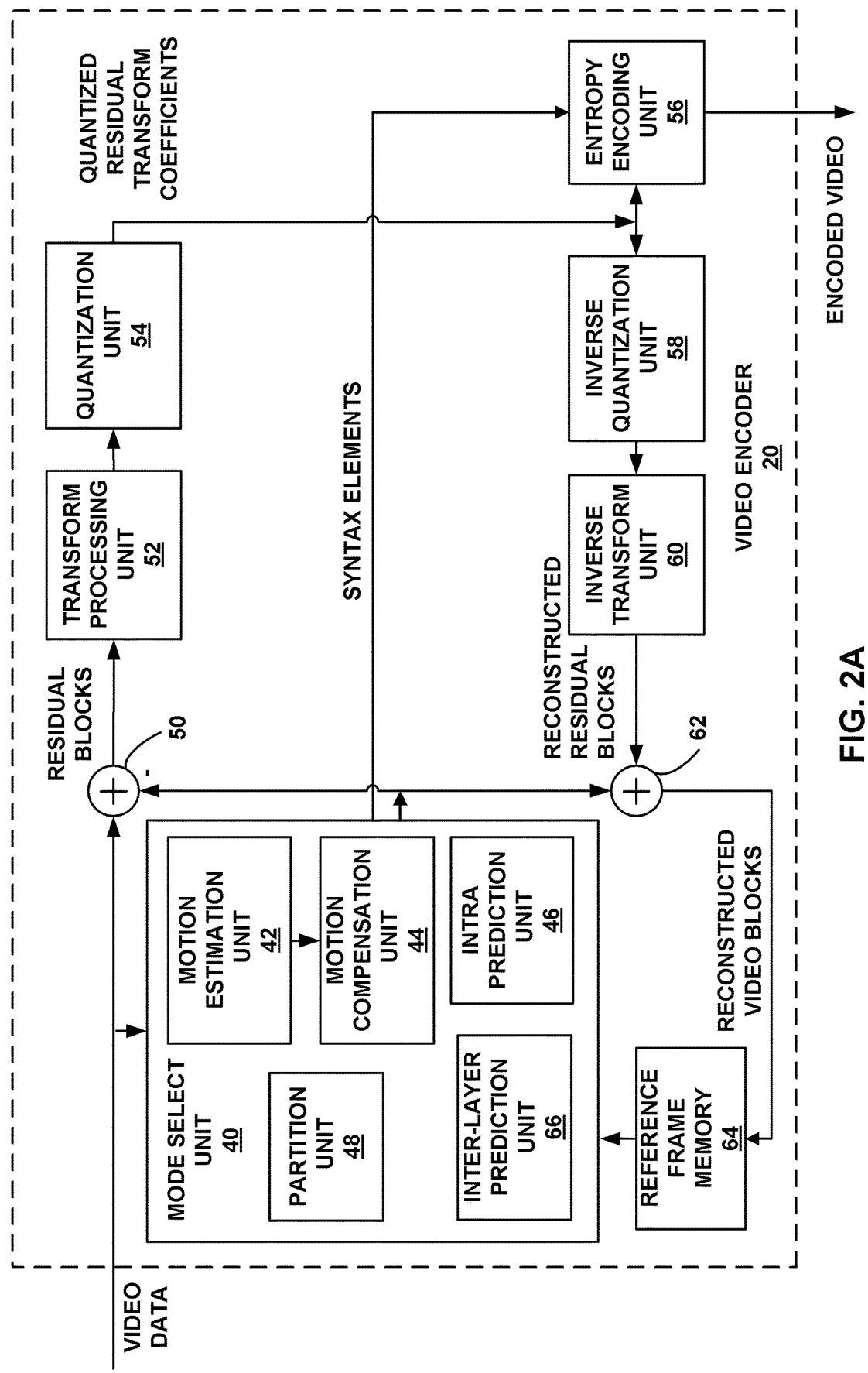
FIG. 2A is a block diagram illustrating an example of a video encoder that may implement techniques in accordance with aspects described in this disclosure.

FIG. 2A is a block diagram illustrating an example of a video encoder that may implement techniques in accordance with aspects described in this disclosure. Video encoder 20 may be configured to process a single layer of a video bitstream, such as for HEVC. Further, video encoder 20 may be configured to perform any or all of the techniques of this disclosure, including but not limited to the methods of performing inter-layer prediction signaling and related processes described in greater detail above and below with respect to FIGS. 4-6. As one example, inter-layer prediction unit 66 (when provided) may be configured to perform any or all of the techniques described in this disclosure. However, aspects of this disclosure are not so limited. In some examples, the techniques described in this disclosure may be shared among the various components of video encoder 20. In some examples, additionally or alternatively, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods. The encoder 20 of FIG. 2A illustrates a single layer of a codec. However, as will be described further with respect to FIG. 2B, some or all of the video encoder 20 may be duplicated for processing according to a multi-layer codec.

Video encoder 20 may perform intra-, inter-, and inter-layer prediction (sometime referred to as intra-, inter- or inter-layer coding) of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Inter-layer coding relies on prediction based upon video within a different layer(s) within the same video coding sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2A, video encoder 20 receives a current video block within a video frame to be encoded. In the example of FIG. 2A, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, inter-layer prediction unit 66, and partition unit 48. Reference frame memory 64 may include a decoded picture buffer. The decoded picture buffer is a broad term having its ordinary meaning, and in some embodiments refers to a video codec-managed data structure of reference frames.

For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization, etc.). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra, inter, or inter-layer prediction mode, e.g., based on error results, and provide the resulting intra-, inter-, or inter-layer coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In some embodiments, motion estimation unit 42 can perform motion estimation relative to luma components, and motion compensation unit 44 can use motion vectors calculated based on the luma components for both chroma components and luma components. Mode select unit 40 may generate syntax elements associated with the video blocks and the video slice for use by video decoder 30 in decoding the video blocks of the video slice.

Intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

The video encoder 20 may include an inter-layer prediction unit 66. Inter-layer prediction unit 66 is configured to predict a current block (e.g., a current block in the EL) using one or more different layers that are available in SVC (e.g., a base or reference layer). Such prediction may be referred to as inter-layer prediction. Inter-layer prediction unit 66 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction.

Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. When the base and enhancement layers have different spatial resolutions, spatial motion vector scaling and/or inter-layer position mapping using a temporal scaling function may be performed by the inter-layer prediction unit 66, as described in greater detail below.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. For example, discrete sine transforms (DST), wavelet transforms, integer transforms, sub-band transforms or other types of transforms can also be used.

Transform processing unit 52 can apply the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain (e.g., for later use as a reference block). Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Multi-Layer Video Encoder

Figure 2B:
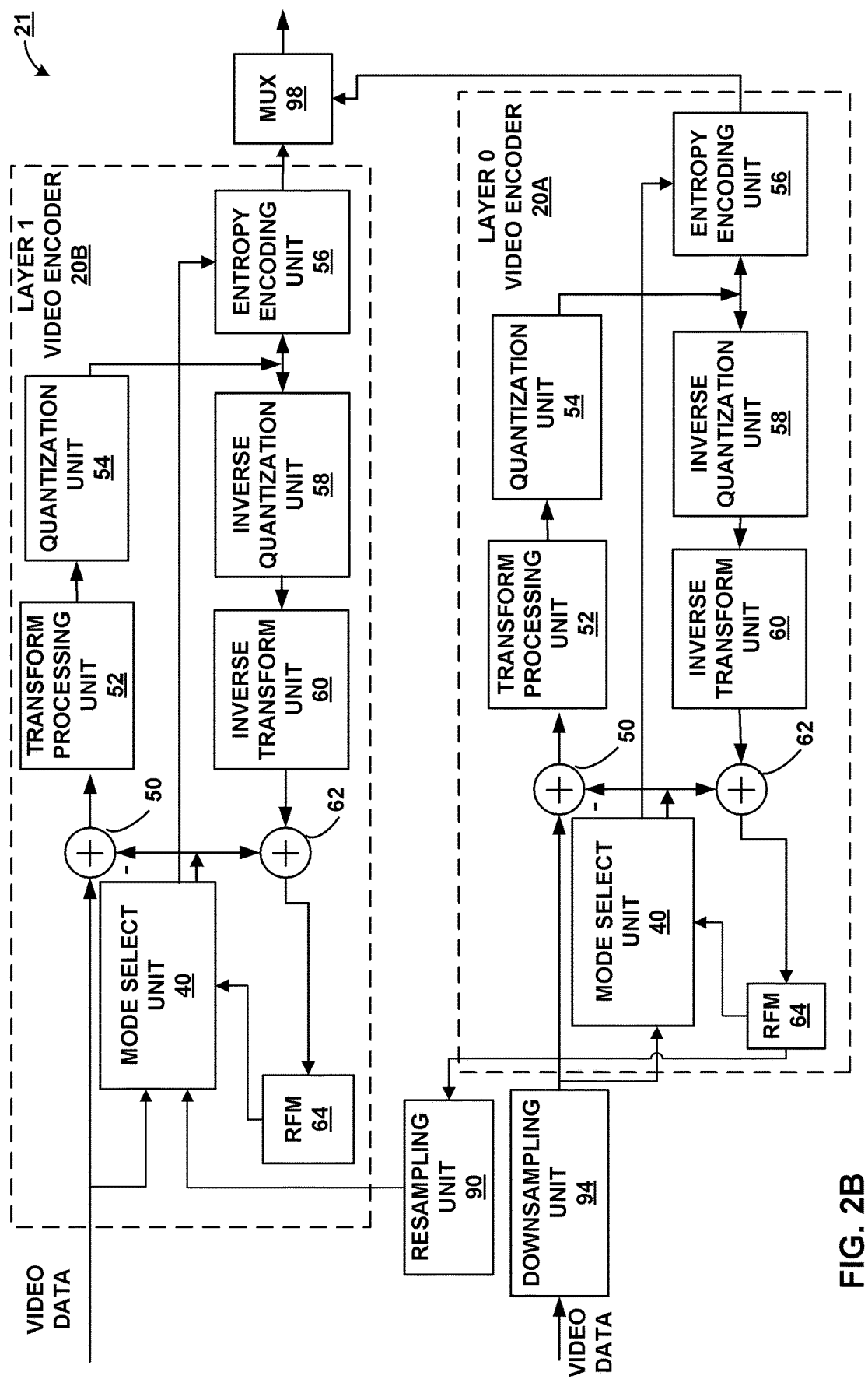
FIG. 2B is a block diagram illustrating an example of a video encoder that may implement techniques in accordance with aspects described in this disclosure.

FIG. 2B is a block diagram illustrating an example of a multi-layer video encoder 21 that may implement techniques in accordance with aspects described in this disclosure. The video encoder 21 may be configured to process multi-layer video frames, such as for SHVC and multiview coding. Further, the video encoder 21 may be configured to perform any or all of the techniques of this disclosure.

The video encoder 21 includes a video encoder 20A and video encoder 20B, each of which may be configured as the video encoder 20 of FIG. 2A and may perform the functions described above with respect to the video encoder 20. Further, as indicated by the reuse of reference numbers, the video encoders 20A and 20B may include at least some of the systems and subsystems as the video encoder 20. Although the video encoder 21 is illustrated as including two video encoders 20A and 20B, the video encoder 21 is not limited as such and may include any number of video encoder 20 layers. In some embodiments, the video encoder 21 may include a video encoder 20 for each picture or frame in an access unit. For example, an access unit that includes five pictures may be processed or encoded by a video encoder that includes five encoder layers. In some embodiments, the video encoder 21 may include more encoder layers than frames in an access unit. In some such cases, some of the video encoder layers may be inactive when processing some access units.

In addition to the video encoders 20A and 20B, the video encoder 21 may include a resampling unit 90. The resampling unit 90 may, in some cases, upsample a base layer of a received video frame to, for example, create an enhancement layer. The resampling unit 90 may upsample particular information associated with the received base layer of a frame, but not other information. For example, the resampling unit 90 may upsample the spatial size or number of pixels of the base layer, but the number of slices or the picture order count may remain constant. In some cases, the resampling unit 90 may not process the received video and/or may be optional. For example, in some cases, the mode select unit 40 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a base layer, or a lower layer in an access unit, in some cases, the resampling unit 90 may downsample a layer. For example, if during streaming of a video bandwidth is reduced, a frame may be downsampled instead of upsampled. Resampling unit 90 may be further configured to perform cropping and/or padding operations, as well.

The resampling unit 90 may be configured to receive a picture or frame (or picture information associated with the picture) from the decoded picture buffer 114 of the lower layer encoder (e.g., the video encoder 20A) and to upsample the picture (or the received picture information). This upsampled picture may then be provided to the mode select unit 40 of a higher layer encoder (e.g., the video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 64 of the video encoder 20A may be provided directly, or at least without being provided to the resampling unit 90, to the mode select unit 40 of the video encoder 20B. For example, if video data provided to the video encoder 20B and the reference picture from the decoded picture buffer 64 of the video encoder 20A are of the same size or resolution, the reference picture may be provided to the video encoder 20B without any resampling.

In some embodiments, the video encoder 21 downsamples video data to be provided to the lower layer encoder using the downsampling unit 94 before provided the video data to the video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, the video encoder 21 may further include a multiplexor 98, or mux. The mux 98 can output a combined bitstream from the video encoder 21. The combined bitstream may be created by taking a bitstream from each of the video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of the video encoders 20A and 20B. For instance, two blocks may be output from the video encoder 20B for each block output from the video encoder 20A. In some embodiments, the output stream from the mux 98 may be preprogrammed. In other embodiments, the mux 98 may combine the bitstreams from the video encoders 20A, 20B based on a control signal received from a system external to the video encoder 21, such as from a processor on the source device 12. The control signal may be generated based on the resolution or bitrate of a video from the video source 18, based on a bandwidth of the channel 16, based on a subscription associated with a user (e.g., a paid subscription versus a free subscription), or based on any other factor for determining a resolution output desired from the video encoder 21.

Video Decoder

Figure 3A:
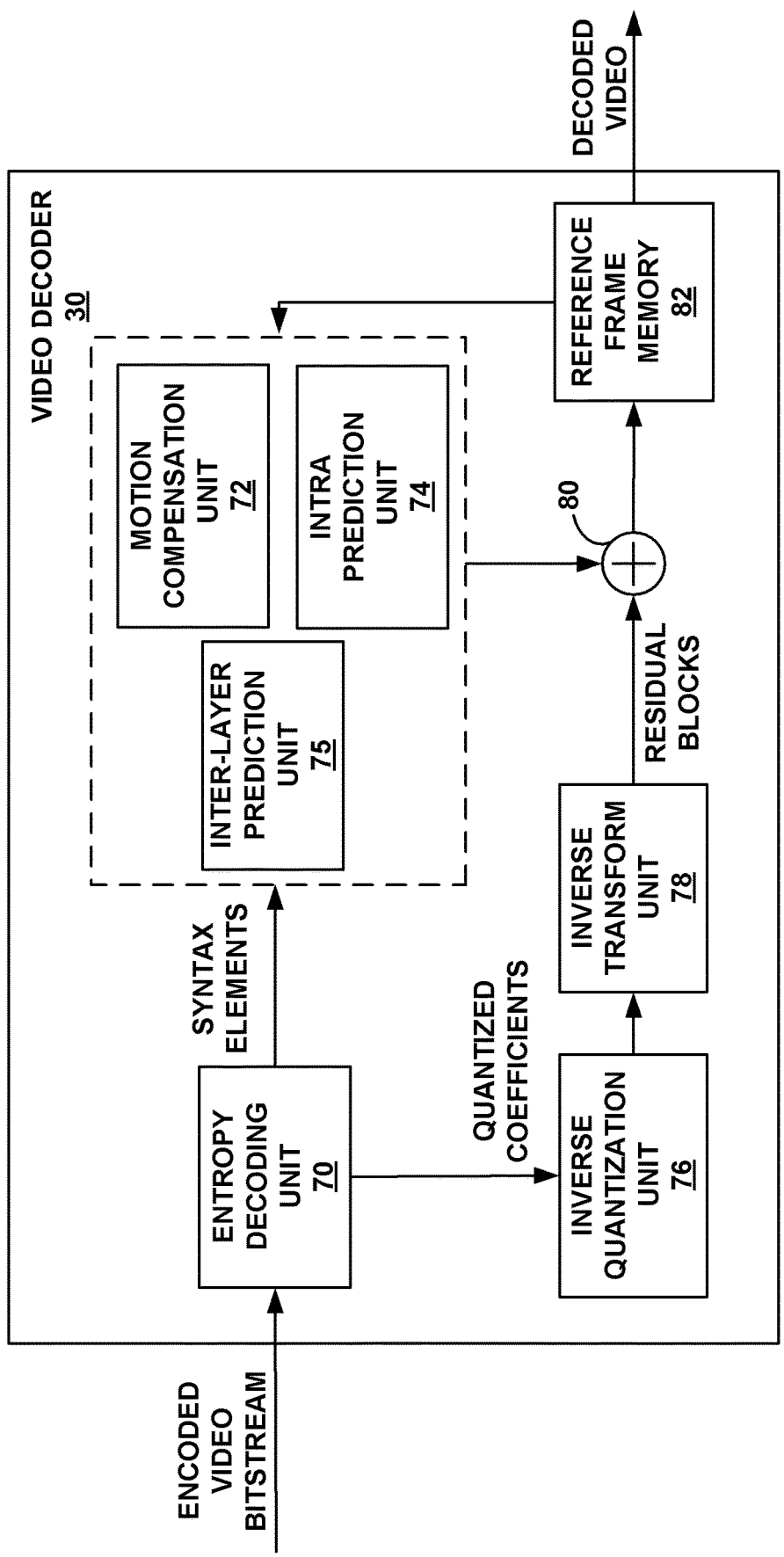
FIG. 3A is a block diagram illustrating an example of a video decoder that may implement techniques in accordance with aspects described in this disclosure.

FIG. 3A is a block diagram illustrating an example of a video decoder that may implement techniques in accordance with aspects described in this disclosure. The video decoder 30 may be configured to process a single layer of a video bitstream, such as for HEVC. Further, video decoder 30 may be configured to perform any or all of the techniques of this disclosure, including but not limited to the methods of performing inter-layer prediction signaling and related processes described in greater detail above and below with respect to FIGS. 4-6. As one example, inter-layer prediction unit 75 may be configured to perform any or all of the techniques described in this disclosure. However, aspects of this disclosure are not so limited. In some examples, the techniques described in this disclosure may be shared among the various components of video decoder 30. In some examples, additionally or alternatively, a processor (not shown) may be configured to perform any or all of the techniques described in this disclosure.

For purposes of explanation, this disclosure describes video decoder 30 in the context of HEVC coding. However, the techniques of this disclosure may be applicable to other coding standards or methods. The decoder 30 of FIG. 3A illustrates a single layer of a codec. However, as will be described further with respect to FIG. 3B, some or all of the video decoder 30 may be duplicated for processing according to a multi-layer codec.

In the example of FIG. 3A, video decoder 30 includes an entropy decoding unit 70, motion compensation unit 72, intra prediction unit 74, inter-layer prediction unit 75, inverse quantization unit 76, inverse transformation unit 78, reference frame memory 82 and summer 80. In some embodiments, motion compensation unit 72 and/or intra prediction unit 74 may be configured to perform inter-layer prediction, in which case the inter-layer prediction unit 75 may be omitted. Video decoder 30 may, in some examples, perform a decoding pass generally reciprocal to the encoding pass described with respect to video encoder 20 (FIG. 2A). Motion compensation unit 72 may generate prediction data based on motion vectors received from entropy decoding unit 70, while intra-prediction unit 74 may generate prediction data based on intra-prediction mode indicators received from entropy decoding unit 70. Reference frame memory 82 may include a decoded picture buffer. The decoded picture buffer is a broad term having its ordinary meaning, and in some embodiments refers to a video codec-managed data structure of reference frames.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Video decoder 30 may also include an inter-layer prediction unit 75. The inter-layer prediction unit 75 is configured to predict a current block (e.g., a current block in the EL) using one or more different layers that are available in SVC (e.g., a base or reference layer). Such prediction may be referred to as inter-layer prediction. Inter-layer prediction unit 75 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. When the base and enhancement layers have different spatial resolutions, spatial motion vector scaling and/or inter-layer position mapping may be performed by the inter-layer prediction unit 75 using a temporal scaling function, as described in greater detail below.

Inverse quantization unit 76 inverse quantizes, e.g., de-quantizes, the quantized transform coefficients provided in the bitstream and decoded by entropy decoding unit 70. The inverse quantization process may include use of a quantization parameter QPY calculated by video decoder 30 for each video block in the video slice to determine a degree of quantization and, likewise, a degree of inverse quantization that should be applied.

Inverse transform unit 78 applies an inverse transform, e.g., an inverse DCT, an inverse DST, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference frame memory 82 also stores decoded video for later presentation on a display device, such as display device 32 of FIG. 1.

Multi-Layer Decoder

Figure 3B:
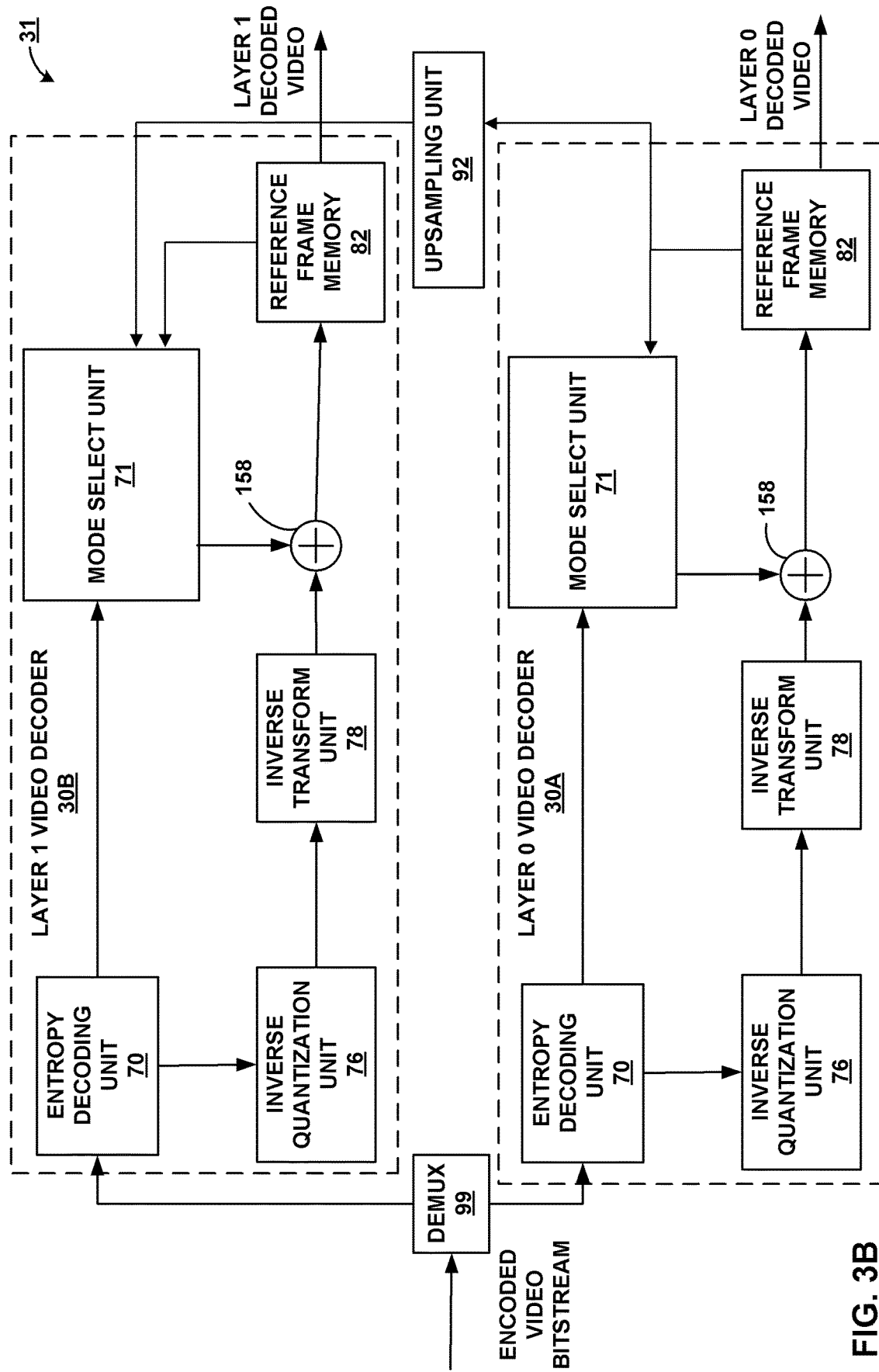
FIG. 3B is a block diagram illustrating an example of a video decoder that may implement techniques in accordance with aspects described in this disclosure.

FIG. 3B is a block diagram illustrating an example of a multi-layer video decoder 31 that may implement techniques in accordance with aspects described in this disclosure. The video decoder 31 may be configured to process multi-layer video frames, such as for SHVC and multiview coding. Further, the video decoder 31 may be configured to perform any or all of the techniques of this disclosure.

The video decoder 31 includes a video decoder 30A and video decoder 30B, each of which may be configured as the video decoder 30 of FIG. 3A and may perform the functions described above with respect to the video decoder 30. Further, as indicated by the reuse of reference numbers, the video decoders 30A and 30B may include at least some of the systems and subsystems as the video decoder 30. Although the video decoder 31 is illustrated as including two video decoders 30A and 30B, the video decoder 31 is not limited as such and may include any number of video decoder 30 layers. In some embodiments, the video decoder 31 may include a video decoder 30 for each picture or frame in an access unit. For example, an access unit that includes five pictures may be processed or decoded by a video decoder that includes five decoder layers. In some embodiments, the video decoder 31 may include more decoder layers than frames in an access unit. In some such cases, some of the video decoder layers may be inactive when processing some access units.

In addition to the video decoders 30A and 30B, the video decoder 31 may include an upsampling unit 92. In some embodiments, the upsampling unit 92 may upsample a base layer of a received video frame to create an enhanced layer to be added to the reference picture list for the frame or access unit. This enhanced layer can be stored in the reference frame memory 82 (e.g., in its decoded picture buffer, etc.). In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame The upsampling unit 92 may be configured to receive a picture or frame (or picture information associated with the picture) from the decoded picture buffer 82 of the lower layer decoder (e.g., the video decoder 30A) and to upsample the picture (or the received picture information). This upsampled picture may then be provided to the mode select unit 71 of a higher layer decoder (e.g., the video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 82 of the video decoder 30A may be provided directly, or at least without being provided to the upsampling unit 92, to the mode select unit 71 of the video decoder 30B. For example, if video data provided to the video decoder 30B and the reference picture from the decoded picture buffer 82 of the video decoder 30A are of the same size or resolution, the reference picture may be provided to the video decoder 30B without upsampling. Further, in some embodiments, the upsampling unit 92 may be a resampling unit 90 configured to upsample or downsample a reference picture received from the decoded picture buffer 82 of the video decoder 30A.

As illustrated in FIG. 3B, the video decoder 31 may further include a demultiplexor 99, or demux. The demux 99 can split an encoded video bitstream into multiple bitstreams with each bitstream output by the demux 99 being provided to a different video decoder 30A and 30B. The multiple bitstreams may be created by receiving a bitstream and each of the video decoders 30A and 30B receives a portion of the bitstream at a given time. While in some cases the bits from the bitstream received at the demux 99 may be alternated one bit at a time between each of the video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of the video decoders 30A and 30B. For instance, two blocks may be provided to the video decoder 30B for each block provided to the video decoder 30A. In some embodiments, the division of the bitstream by the demux 99 may be preprogrammed. In other embodiments, the demux 99 may divide the bitstream based on a control signal received from a system external to the video decoder 31, such as from a processor on the destination device 14. The control signal may be generated based on the resolution or bitrate of a video from the input interface 28, based on a bandwidth of the channel 16, based on a subscription associated with a user (e.g., a paid subscription versus a free subscription), or based on any other factor for determining a resolution obtainable by the video decoder 31.

Inter-Layer Prediction Signaling and Related Processes

FIG. 4 illustrates one embodiment of a method of performing inter-layer prediction signaling and related processes that may be performed by the video encoder 20 of FIG. 2 or the video decoder 30 of FIG. 3. The method 400 may be performed by any one or more of the motion estimation unit 42, motion compensation unit 44, intra prediction unit 46, and inter-layer prediction unit 66 of the video encoder 20 of FIG. 2. In another embodiment, the method 400 may be performed by any one or more of the motion compensation unit 72, intra prediction unit 74, and inter-layer prediction unit 75 of the decoder of FIG. 3.

The method 400 begins at block 410. At block 420, an indication of the number of pictures to use to predict the current picture using inter-layer prediction is provided. The indication can correspond to the num_inter_layer_ref_pics syntax discussed in greater detail above. The indication specifies the number of pictures used by the current picture for inter-layer prediction. In one embodiment, when not present, the value of the indication is inferred to be equal to 0. The value of the indication is in the range of 0 to NumDirectRefLayers[LayerIdInVps [nuh_layer_id]], inclusive. At block 430, an indication of which particular inter-layer reference pictures are to be used to predict the current picture using inter-layer prediction is provided. The indication can correspond to the ref_layer_idx_delta[i] syntax discussed in greater detail above. In another embodiment, the indication can correspond to RefPicLayerId[i], as discussed above. At block 440 an inter-layer reference picture set for the current picture is determined. The inter-layer reference picture set is determined using the number of inter-layer reference pictures and the indication of which inter-layer reference pictures to use to predict the current picture using inter-layer prediction. The method 400 ends at block 450.

FIG. 5 illustrates another embodiment of a method of performing inter-layer prediction signaling and related processes that may be performed by the video encoder 20 of FIG. 2 or the video decoder 30 of FIG. 3. The method 500 may be performed by any one or more of the motion estimation unit 42, motion compensation unit 44, intra prediction unit 46, and inter-layer prediction unit 66 of the video encoder 20 of FIG. 2. In another embodiment, the method 500 may be performed by any one or more of the motion compensation unit 72, intra prediction unit 74, and inter-layer prediction unit 75 of the decoder of FIG. 3.

The method 500 begins at block 510. At block 520, an indication of the number of pictures to use to predict the current picture using inter-layer prediction is provided. The indication can correspond to the num_inter_layer_ref_pics syntax discussed in greater detail above. The indication specifies the number of pictures used by the current picture for inter-layer prediction. In one embodiment, when not present, the value of the indication is inferred to be equal to 0. The value of the indication is in the range of 0 to NumDirectRefLayers[LayerIdInVps[nuh_layer_id]], inclusive. At block 530, an indication of which particular inter-layer reference pictures are to be used to predict the current picture using inter-layer prediction is provided. The indication can correspond to the ref_layer_idx_delta[i] syntax discussed in greater detail above. In another embodiment, the indication can correspond to RefPicLayerId[i], as discussed above. At block 540 it is determined whether a picture in an inter-layer reference picture set for the current picture that is not in the decoded picture buffer (e.g., the decoded picture buffer of the reference frame memory of FIGS. 2 and 3) was lost during transmission to the decoded picture buffer or was not provided. The method 500 ends at block 550.

Figure 6:
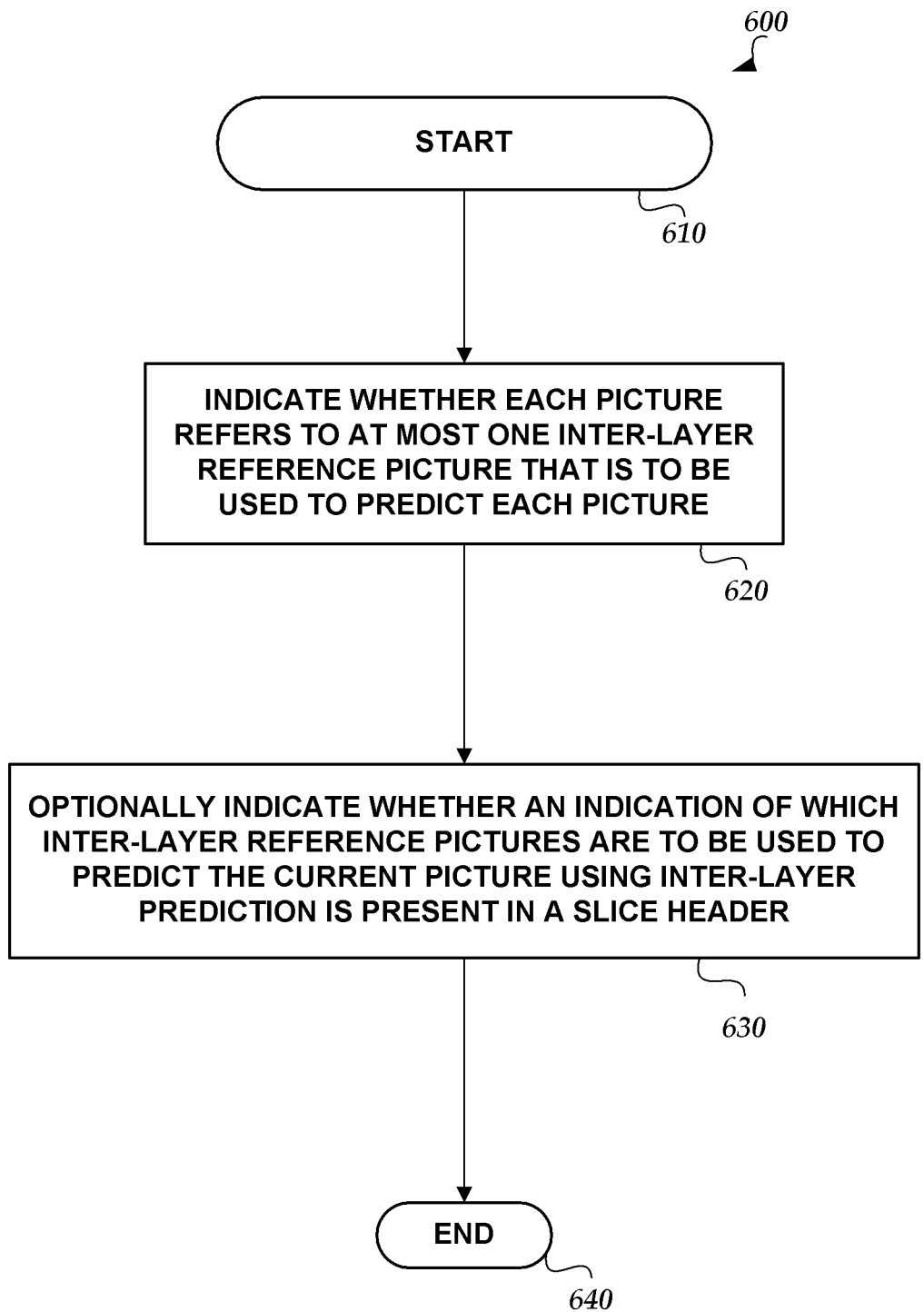

FIG. 6 illustrates another embodiment of a method of performing inter-layer prediction signaling and related processes that may be performed by the video encoder 20 of FIG. 2 or the video decoder 30 of FIG. 3. The method 600 may be performed by any one or more of the motion estimation unit 42, motion compensation unit 44, intra prediction unit 46, and inter-layer prediction unit 66 of the video encoder 20 of FIG. 2. In another embodiment, the method 600 may be performed by any one or more of the motion compensation unit 72, intra prediction unit 74, and inter-layer prediction unit 75 of the decoder of FIG. 3.

The method 600 begins at block 610. At block 620, an indication is provided that indicates whether each picture to code (e.g., predict) refers to at most one inter-layer reference picture that is to be used to code each picture. The indication can correspond to the one_ilp_ref_pic_only_flag discussed in greater detail above. At block 630, an indication is optionally provided. The optional indication corresponds to whether an indication of which inter-layer reference pictures are to be used to predict the current picture using inter-layer prediction is present in a slice header. The optional indication can correspond to the ilp_ref_pic_present_in_slice_flag discussed in greater detail above. The method 600 ends at block 640.

Terminology

While the above disclosure has described particular embodiments, many variations are possible. For example, as mentioned above, the above techniques may be applied to 3D video encoding. In some embodiments of 3D video, a reference layer (e.g., a base layer) includes video information sufficient to display a first view of a video and the enhancement layer includes additional video information relative to the reference layer such that the reference layer and the enhancement layer together include video information sufficient to display a second view of the video. These two views can used to generate a stereoscopic image. As discussed above, motion information from the reference layer can be used to identify additional implicit hypothesis when encoding or decoding a video unit in the enhancement layer, in accordance with aspects of the disclosure. This can provide greater coding efficiency for a 3D video bitstream.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Various embodiments of the invention have been described. These and other embodiments are within the scope of the following claims.

What is claimed is:

1. An apparatus configured to code video information, the apparatus comprising:
 a memory including a decoded picture buffer (DPB) configured to store one or more inter-layer reference pictures to be used to predict one or more pictures in a current layer; and
 a processor operationally coupled to the memory and configured to:
  signal or receive, in a slice segment header for a slice included in a current picture, an indication indicative of a number of the one or more inter-layer reference pictures to be used to predict the current picture in the current layer using inter-layer prediction;
  signal or receive, in the slice segment header and for each of the number of the one or more inter-layer reference pictures, an indication of a reference layer including the inter-layer reference picture to be used to predict the current picture using inter-layer prediction;
  determine, based on the number of the one or more inter-layer reference pictures to be used and the indications of the reference layers, an inter-layer reference picture set to be used to predict the current picture using inter-layer prediction;
  determine a set of lost one or more inter-layer reference pictures as including one or more of the inter-layer reference pictures in the inter-layer reference picture set that are not stored in the DPB; and
  re-request transmission of the set of lost one or more inter-layer reference pictures in response to determining the set of lost one or more inter-layer reference pictures.

2. The apparatus of claim 1, wherein the processor is further configured to signal zero or one direct dependent layer associated with the current picture in a slice header associated with the current picture.

3. The apparatus of claim 1, wherein the processor is further configured to, prior to determining the inter-layer reference picture set, empty the inter-layer reference picture set.

4. The apparatus of claim 1, wherein the number of interlayer reference pictures to be used to predict the current picture using inter-layer prediction is between 0 and a number of direct reference layers associated with the current picture.

5. The apparatus of claim 1, wherein the processor is further configured to require all slices of the current picture to use the same number of inter-layer reference pictures for inter-layer prediction as the determined number of inter-layer reference pictures to be used to predict the current picture.

6. The apparatus of claim 1, wherein the processor is further configured to determine that the current picture is to be predicted without using inter-layer prediction based on a determination that the number of inter-layer reference pictures to be used to predict the current picture equals zero.

7. The apparatus of claim 1, wherein the processor is further configured to restrict the number to be either zero or one.

8. The apparatus of claim 1, wherein the processor is configured to encode the current picture using inter-layer prediction based on the inter-layer reference picture set.

9. The apparatus of claim 1, wherein the processor is configured to decode the current picture using inter-layer prediction based on the inter-layer reference picture set.

10. The apparatus of claim 1, further comprising a device selected from the group consisting of: a digital television, a digital direct broadcast system, a wireless broadcast system, a personal digital assistant (PDA), a laptop computer, a desktop computer, a tablet computer, an e-book reader, a digital camera, a digital recording device, a digital media player, a video gaming device, a video game console, a cellular telephone, a satellite radio telephones, a smart phone, a video teleconferencing device, and a video streaming device.

11. A method of decoding video information, comprising:
    storing, in a decoded picture buffer (DPB), inter-layer reference pictures to be used to predict one or more pictures in a current layer;
    receiving, in a slice segment header for a slice included in a current picture, an indication indicative of a number of inter-layer reference pictures to be used to predict the current picture in the current layer using inter-layer prediction;
    receiving, in the slice segment header and for each of the number of the one or more inter-layer reference pictures, an indication of a reference layer including the inter-layer reference picture to be used to predict the current picture using inter-layer prediction;
    determining, based on the number of inter-layer reference pictures to be used and the indications of the reference layers, an inter-layer reference picture set to be used to predict the current picture using inter-layer prediction;
    decoding the current picture using inter-layer prediction based on the inter-layer reference picture set;
    determining a set of lost one or more inter-layer reference pictures as including one or more of the inter-layer reference pictures in the inter-layer reference picture set that are not stored in the DPB; and
    re-requesting transmission of the set of lost one or more inter-layer reference pictures in response to determining the set of lost one or more inter-layer reference pictures.

12. The method of claim 11, further comprising signaling zero or one direct dependent layer associated with the current picture in a slice header associated with the current picture.

13. The method of claim 11, further comprising emptying the inter-layer reference picture set prior to determining the inter-layer picture set.

14. The method of claim 11, wherein the number of interlayer reference pictures to be used to predict the current picture using inter-layer prediction is between 0 and a number of direct reference layers associated with the current picture.

15. The method of claim 11, further comprising requiring all slices of the current picture to use the same number of inter-layer reference pictures for interlayer prediction as the determined number of inter-layer reference pictures to be used to predict the current picture.

16. The method of claim 11, further comprising determining that the current picture is to be predicted without using inter-layer prediction based on a determination that the number of inter-layer reference pictures to be used to predict the current picture equals zero.

17. The method of claim 11, further comprising restricting the number to be either zero or one.

18. A method of encoding video information, comprising:
    storing, in a decoded picture buffer (DPB), inter-layer reference pictures to be used to predict one or more pictures in a current layer;
    encoding, in a slice segment header for a slice included in a current picture, an indication indicative of a number of inter-layer reference pictures to be used to predict the current picture in the current layer using inter-layer prediction;
    encoding, in the slice segment header and for each of the number of the one or more inter-layer reference pictures, an indication of a reference layer including the inter-layer reference picture to be used to predict the current picture using inter-layer prediction;
    determining, based on the number of inter-layer reference pictures to be used and the indications of the reference layers, an inter-layer reference picture set to be used to predict the current picture using inter-layer prediction;
    encoding the current picture using inter-layer prediction based on the inter-layer reference picture set;
    determining a set of lost one or more inter-layer reference pictures as including one or more of the inter-layer reference pictures in the inter-layer reference picture set that are not stored in the DPB; and
    re-requesting transmission of the set of lost one or more inter-layer reference pictures in response to determining the set of lost one or more inter-layer reference pictures.

19. The method of claim 18, further comprising signaling zero or one direct dependent layer associated with the current picture in a slice header associated with the current picture.

20. The method of claim 18, further comprising emptying the inter-layer reference picture set prior to determining the inter-layer picture set.

21. The method of claim 18, wherein the number of interlayer reference pictures to be used to predict the current picture using inter-layer prediction is between 0 and a number of direct reference layers associated with the current picture.

22. The method of claim 18, further comprising requiring all slices of the current picture to use the same number of inter-layer reference pictures for interlayer prediction as the determined number of inter-layer reference pictures to be used to predict the current picture.

23. The method of claim 18, further comprising determining that the current picture is to be predicted without using inter-layer prediction based on a determination that the number of inter-layer reference pictures to be used to predict the current picture equals zero.

24. The method of claim 18, further comprising restricting the number to be either zero or one.

25. An apparatus configured to code video information, the apparatus comprising:

means for storing, in a decoded picture buffer (DPB), inter-layer reference pictures to be used to predict one or more pictures in a current layer;

means for coding, in a slice segment header for a slice included in a current picture, an indication indicative of a number of inter-layer reference pictures to be used to predict the current picture in the current layer using inter-layer prediction;

means for coding, in the slice segment header and for each of the number of the one or more inter-layer reference pictures, an indication of a reference layer including the inter-layer reference picture to be used to predict the current picture using inter-layer prediction;

means for determining, based on the number of inter-layer reference pictures to be used and the indications of the reference layers, an inter-layer reference picture set to be used to predict the current picture using inter-layer prediction;

means for coding the current picture using inter-layer prediction based on the inter-layer reference picture set;

means for determining a set of lost one or more inter-layer reference pictures as including one or more of the inter-layer reference pictures in the inter-layer reference picture set that are not stored in the DPB; and means for re-requesting transmission of the set of lost one or more inter-layer reference pictures in response to determining the set of lost one or more inter-layer reference pictures.

26. The apparatus of claim 25, further comprising means for signaling zero or one direct dependent layer associated with the current picture in a slice header associated with the current picture.

27. The apparatus of claim 25, further comprising means for emptying the inter-layer reference picture set prior to determining the inter-layer picture set.

28. A non-transitory computer readable medium comprising specific instruction that when executed on a processor comprising computing hardware cause the processor to:

store, in a decoded picture buffer (DPB), inter-layer reference pictures to be used to predict one or more pictures in a current layer;

signal or receive, in a slice segment header for a slice included in a current picture, an indication indicative of a number of inter-layer reference pictures to be used to predict the current picture in the current layer using interlayer prediction;

signal or receive, in the slice segment header and for each of the number of the one or more inter-layer reference pictures, an indication of a reference layer including the inter-layer reference picture to be used to predict the current picture using inter-layer prediction;

determine, based on the number of inter-layer reference pictures to be used and the indications of the reference layers, an inter-layer reference picture set to be used to predict the current picture using inter-layer prediction;

determine a set of lost one or more inter-layer reference pictures as including one or more of the inter-layer reference pictures in the inter-layer reference picture set that are not stored in the DPB; and re-request transmission of the set of lost one or more inter-layer reference pictures in response to determining the set of lost one or more inter-layer reference pictures.

29. The non-transitory computer readable medium of claim 28, further comprising instructions that cause the processor to signal zero or one direct dependent layer associated with the current picture in a slice header associated with the current picture.

30. The non-transitory computer readable medium of claim 28, further comprising instructions that cause the processor to empty the inter-layer reference picture set prior to determining the inter-layer picture set.

* * * * *